(12) United States Patent
Hashimoto et al.

(10) Patent No.: US 11,015,545 B2
(45) Date of Patent: May 25, 2021

(54) MISFIRE DETECTION APPARATUS, MISFIRE DETECTION SYSTEM, AND DATA ANALYSIS APPARATUS

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/987,708

(22) Filed: Aug. 7, 2020

(65) Prior Publication Data

US 2021/0054797 A1   Feb. 25, 2021

(30) Foreign Application Priority Data

Aug. 22, 2019 (JP) .............................. JP2019-152136

(51) Int. Cl.
*F02D 41/14* (2006.01)
*F02D 41/24* (2006.01)
*F02D 41/22* (2006.01)

(52) U.S. Cl.
CPC ......... *F02D 41/1498* (2013.01); *F02D 41/22* (2013.01); *F02D 41/2451* (2013.01); *F02D 41/2477* (2013.01); *F02D 2200/101* (2013.01)

(58) Field of Classification Search
CPC .. F02D 41/1498; F02D 41/2477; F02D 41/22; F02D 41/2451; F02D 2200/101
See application file for complete search history.

(56) References Cited

U.S. PATENT DOCUMENTS

| | | | | |
|---|---|---|---|---|
| 5,109,820 A | * | 5/1992 | Iwata | F02P 5/152 123/406.37 |
| 5,544,058 A | * | 8/1996 | Demizu | G01M 15/11 123/406.27 |
| 5,808,186 A | * | 9/1998 | Matsumoto | F02D 41/1498 73/114.03 |

(Continued)

FOREIGN PATENT DOCUMENTS

JP    4-91348 A    3/1992

*Primary Examiner* — George C Jin
(74) *Attorney, Agent, or Firm* — Oblon, McClelland, Maier & Neustadt, L.L.P.

(57) ABSTRACT

A misfire detection apparatus includes storage devices that store first mapping data and second mapping data, and execution devices. The execution device executes a first acquisition process, a first calculation process, a second acquisition process, a second calculation process, a determination process of determining whether or not a calculation result of the second calculation process and a calculation result of the first calculation process match, a count process of counting the number of consecutive times when a determination is made in the determination process that there is mismatch, and a transmission process of transmitting, to an outside of the vehicle, data on the value of the second misfire variable corresponding to the maximum number of times among the numbers of consecutive times counted in the count process during a predetermined period and data on the second input data used for calculating the value of the second misfire variable.

20 Claims, 9 Drawing Sheets

(56) References Cited

U.S. PATENT DOCUMENTS

| | | | |
|---|---|---|---|
| 2006/0117834 A1* | 6/2006 | Goto | G01L 23/225 |
| | | | 73/35.09 |
| 2008/0000448 A1* | 1/2008 | Kaneko | F02P 5/152 |
| | | | 123/406.37 |
| 2017/0234245 A1* | 8/2017 | Bruner | F02D 35/027 |
| | | | 123/525 |

* cited by examiner

MISFIRE DETECTION APPARATUS, MISFIRE DETECTION SYSTEM, AND DATA ANALYSIS APPARATUS

INCORPORATION BY REFERENCE

The disclosure of Japanese Patent Application No. 2019-152136 filed on Aug. 22, 2019 including the specification, drawings and abstract is incorporated herein by reference in its entirety.

BACKGROUND

1. Technical Field

The present disclosure relates to a misfire detection apparatus, a misfire detection system, and a data analysis apparatus.

2. Description of Related Art

Japanese Unexamined Patent Application Publication No. 4-91348 (JP 4-91348A) proposes an apparatus provided with a neural network which receives a rotation fluctuation amount as a rotation speed change amount and outputs a value indicating whether or not a misfire has occurred in each of a plurality of cylinders of an internal combustion engine.

SUMMARY

In general, in order to enhance the reliability of a learned model which has been learned by machine learning, learning using training data in various situations needs to be performed. However, before the learned model is mounted on the vehicle, sufficient training data for various situations that may occur when the learned model is actually mounted on the vehicle cannot always be obtained. When sufficient training data cannot be obtained, it is difficult to verify whether or not the neural network outputs a correct value in various situations when the neural network is mounted on a vehicle.

The present disclosure provides a misfire detection apparatus, a misfire detection system, and a data analysis apparatus.

A first aspect of the present disclosure relates to a misfire detection apparatus including a storage device and an execution device. The storage device stores first mapping data defining a first mapping for receiving first input data based on a detection value of a crank angle sensor of an internal combustion engine mounted on a vehicle as an input and outputting a value of a first misfire variable that is a variable related to the presence or absence of misfire of the internal combustion engine, and second mapping data defining a second mapping for receiving second input data based on the detection value of the crank angle sensor as an input and outputting a value of a second misfire variable that is a variable related to the presence or absence of misfire of the internal combustion engine, and the second mapping data including data learned by machine learning, and the execution device executes a first acquisition process of acquiring the first input data, a first calculation process of calculating a value of the first misfire variable by using the first input data acquired in the first acquisition process as an input of the first mapping, a second acquisition process of acquiring the second input data, a second calculation process of calculating a value of the second misfire variable by using the second input data acquired in the second acquisition process as an input of the second mapping, a determination process of determining whether or not a calculation result of the second calculation process and a calculation result of the first calculation process match, a count process of counting the number of consecutive times when a determination is made in the determination process that there is mismatch, and a transmission process of transmitting, to an outside of the vehicle, data on the value of the second misfire variable corresponding to the maximum number of times among the numbers of consecutive times counted in the count process during a predetermined period and data on the second input data used for calculating the value of the second misfire variable.

According to the first aspect, data on the value of the second misfire variable when determination is made that the calculation result of the second calculation process and the calculation result of the first calculation process do not match, and data on the second input data used for calculating the value of the second misfire variable are transmitted to the outside of the vehicle. This transmission process is executed by the misfire detection apparatus mounted on the vehicle, so that data in various situations can be transmitted. Therefore, according to the first aspect, it is possible to verify whether or not the value of the second misfire variable in various situations is correct, outside the vehicle.

However, for example, when determination is made that the calculation result of the second calculation process and the calculation result of the first calculation process do not match, in the case of consecutive mismatches among the case of a single mismatch and the case of consecutive mismatches, there is a high probability that there is a difference in reliability between the first mapping and the second mapping. Therefore, compared with the data on the second input data at that time when match is determined once, the data on the second input data at that time when consecutive determinations are made that there is mismatch tends to include more useful information for verifying the reliability of the second mapping. Therefore, according to the first aspect, the data on the value of the second misfire variable when the number of consecutive times when a determination is made that there is mismatch is the maximum number of times and the data on the second input data used for calculating the value are transmitted. As a result, it is possible to transmit useful information while reducing the amount of transmission data as compared with the case of transmitting all data on the second input data corresponding to the case where a determination is made that there is mismatch within the predetermined period.

In the misfire detection apparatus according to the first aspect, the transmission process may include: a process of transmitting data on the maximum number of times, in addition to data on a predetermined number of value among values of the second misfire variable corresponding to the maximum number of times and data on the second input data used for calculating each of the values.

According to the first aspect, even when the value of the second misfire variable corresponding to the maximum number of times exceeds the predetermined number, by limiting the value to be transmitted among the values of the second misfire variable when a determination is made that there is mismatch to a predetermined number, the amount of transmission data can be reduced. By further transmitting the data regarding the maximum number of times, when the value of the second misfire variable corresponding to the maximum number of times exceeds a predetermined number, as compared with the case where the data regarding the maximum number of times is not transmitted, more detailed information to specify the occurring situation can be provided.

In the misfire detection apparatus according to the first aspect, the second input data may be a rotation waveform variable that is a variable including information about a difference between the values of different instantaneous speeds at angular intervals, which are the rotation speed of the crankshaft of the internal combustion engine at angular intervals smaller than the appearance interval of the compression top dead center of the internal combustion engine; data on the second input data used for calculating the value of the second misfire variable may be an instantaneous speed variable which is a variable indicating the instantaneous speed at each of the angular intervals including information about a difference between the instantaneous speeds indicated by the rotation waveform variable used for calculating the value of the second misfire variable when a determination is made that there is mismatch in the determination process; and the data to be transmitted in the transmission process may include the instantaneous speed variable in each of the angular intervals generated before and after the angular interval in time series, including information on the difference between the instantaneous speeds indicated by the rotation waveform variable used for the calculation.

According to the first aspect, the instantaneous speed variable corresponding to the rotation waveform variable used for calculating the value of the second misfire variable, as well as the instantaneous speed variables before and after the instantaneous speed variable in time series are transmitted in the transmission process. Thereby, as compared with the case where solely the instantaneous speed variable corresponding to the rotation waveform variable used for calculating the value of the second misfire variable is transmitted, more detailed information about the rotation behavior of the crankshaft can be provided outside the vehicle.

In the misfire detection apparatus according to the first aspect, the angular interval may be a second interval, the rotation waveform variable may be time-series data configured with a variable that indicates a difference between the instantaneous speed variables by the instantaneous speed variable at each of the consecutive second intervals included in the first interval larger than the second interval, and the data to be transmitted in the transmission process may include the instantaneous speed variable at each of the second intervals adjacent to the first interval, in addition to the instantaneous speed variable at each of the consecutive second intervals included in the first interval when determination is made that there is mismatch in the determination process.

According to the first aspect, since the instantaneous speed variable in each of the consecutive second intervals for both the first interval and the interval adjacent thereto is transmitted in the transmission process, more detailed information on the rotation behavior of the crankshaft can be provided as compared with the case where solely the instantaneous speed variable at intermittent intervals is transmitted.

In the misfire detection apparatus according to the first aspect, the data to be transmitted in the transmission process may include the instantaneous speed variable when a determination is made that there is mismatch in the determination process, in addition to the instantaneous speed variable relating to the rotation waveform variable used for calculating the value of the second misfire variable when a determination is made in the determination process that there is match.

According to the first aspect, the instantaneous speed variable when match is determined is set as the transmission target, so that it is easier to determine when the rotation behavior of the crankshaft does not match, as compared with the case where solely the instantaneous speed variable when a determination is made that there is mismatch is transmitted.

In the misfire detection apparatus according to the first aspect, the data to be transmitted in the transmission process may include the instantaneous speed variable when a determination is made that there is mismatch in the determination process, and the instantaneous speed variable in a state where a determination is made that there is match at a time of transition from a state where a determination is made that there is mismatch to the state where a determination is made that there is match in the determination process.

According to the first aspect, at the time of transition from a state where a determination is made that there is mismatch to the state where a determination is made that there is match in the determination process, the instantaneous speed variable in the state where a determination is made that there is match is to be transmitted. Thus, information on the rotation behavior of the crankshaft before and after returning from a state of mismatch to a state of match can be provided, so that it is easier to determine when the rotation behavior of the crankshaft does not match, as compared with the case where solely the instantaneous speed variable when mismatch is determined is transmitted.

In the misfire detection apparatus according to the first aspect, the execution device may set a time interval between a pair of end times adjacent to each other in time series among end times of travel of the vehicle to the predetermined period, and executes the transmission process at the end time of the travel of the vehicle.

According to the first aspect, by executing the transmission process at the end time of travel of the vehicle, the calculation load of the misfire detection apparatus during the traveling of the vehicle is reduced, as compared with the case where the transmission process is executed during the traveling of the vehicle.

A second aspect of the present disclosure relates to a misfire detection system including the storage device, a first execution device, and a second execution device outside the vehicle. The storage device stores first mapping data defining a first mapping for receiving first input data based on a detection value of a crank angle sensor of an internal combustion engine mounted on a vehicle as an input and outputting a value of a first misfire variable that is a variable related to the presence or absence of misfire of the internal combustion engine, and second mapping data defining a second mapping for receiving second input data based on the detection value of the crank angle sensor as an input and outputting a value of a second misfire variable that is a variable related to the presence or absence of misfire of the internal combustion engine, and the second mapping data including data learned by machine learning, and the first execution device is a first execution device mounted on the vehicle, and executes a first acquisition process of acquiring the first input data, a first calculation process of calculating a value of the first misfire variable by using the first input data acquired in the first acquisition process as an input of the first mapping, a second acquisition process of acquiring the second input data, a second calculation process of calculating a value of the second misfire variable by using the second input data acquired in the second acquisition process as an input of the second mapping, a determination process of determining whether or not a calculation result of the second calculation process and a calculation result of the first calculation process match, a count process of counting the number of consecutive times when a determination is made that there is mismatch in the determination process that the calculation results do not match, and a transmission process of transmitting, to an outside of the vehicle, data on the value of the second misfire variable corresponding to the maximum number of times among the numbers of consecutive times counted in the count process during a predetermined period and data on the second input data used for calculating the value of the second misfire variable, and the second execution device outside the vehicle executes a reception process of receiving the data transmitted in the transmission process, a relearning data generation process for generating relearning data that is data for relearning the second mapping, based on the data received by the reception process, and a relearning process of relearning the second mapping data, based on the relearning data generated in the relearning data generation process.

According to the second aspect, since the second mapping data can be relearned based on the input data to the second mapping when a determination is made that there is mismatch, the second mapping can be configured to output a value with high accuracy in various situations of the vehicle. The fact that the second execution device is "outside the vehicle" means that the second execution device is not an in-vehicle device.

In the misfire detection system according to the second aspect, the relearning data generation process may include a display process of displaying the data received in the reception process on a display apparatus, a validity determination result capturing process of capturing information on whether or not there is an error in the output value of the second mapping, and a process of generating data for updating the second mapping data, based on the information captured in the validity determination result capturing process.

According to the second aspect, by displaying information such as input data to the second mapping transmitted in the transmission process on the display apparatus, the validity of the output of the second mapping can be examined by an entity that can determine the presence or absence of a misfire from information on the second input data, in addition to the first mapping and the second mapping. Then, by the entity capturing the determination result by the validity determination result capturing process, it is possible to determine whether the input data to be displayed should be relearning data for updating the second mapping data.

In the misfire detection system according to the second aspect, the storage device may include a first storage device mounted on the vehicle and a second storage device outside the vehicle, wherein the second storage device stores third mapping data defining a third mapping for receiving third input data based on a detection value of the crank angle sensor as an input and outputting a value of a third misfire variable that is a variable relating to the presence or absence of a misfire of the internal combustion engine, and the relearning data generation process includes a third calculation process of inputting the data received by the reception process to the third mapping and calculates a value of the third misfire variable, and a process of generating data for updating the second mapping data, based on whether or not the calculation result of the third calculation process and the calculation result of the second calculation process match.

According to the second aspect, the validity of the second output value can be verified by determining whether or not the third output value and the second output value match, and whether or not the data is to be used for relearning can be determined. The fact that the second storage device is "outside the vehicle" means that the second storage device is not an in-vehicle device.

A third aspect of the present disclosure relates to a data analysis apparatus including an execution device outside a vehicle. The execution device executes a reception process of receiving data on the value of the misfire variable corresponding to the maximum number of consecutive times among the numbers of consecutive times counted in the predetermined period, transmitted from the vehicle, and data on input data based on the detection value of the crank angle sensor used to calculate the value of the misfire variable, a relearning data generation process of generating relearning data that is data for relearning a mapping, based on the data received by the reception process, and a relearning process of relearning the mapping data, based on the relearning data generated in the relearning data generation process, wherein the mapping is a mapping defined to receive input data based on a detection value of a crank angle sensor as an input and output a value of a misfire variable that is a variable related to the presence or absence of a misfire of the internal combustion engine.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
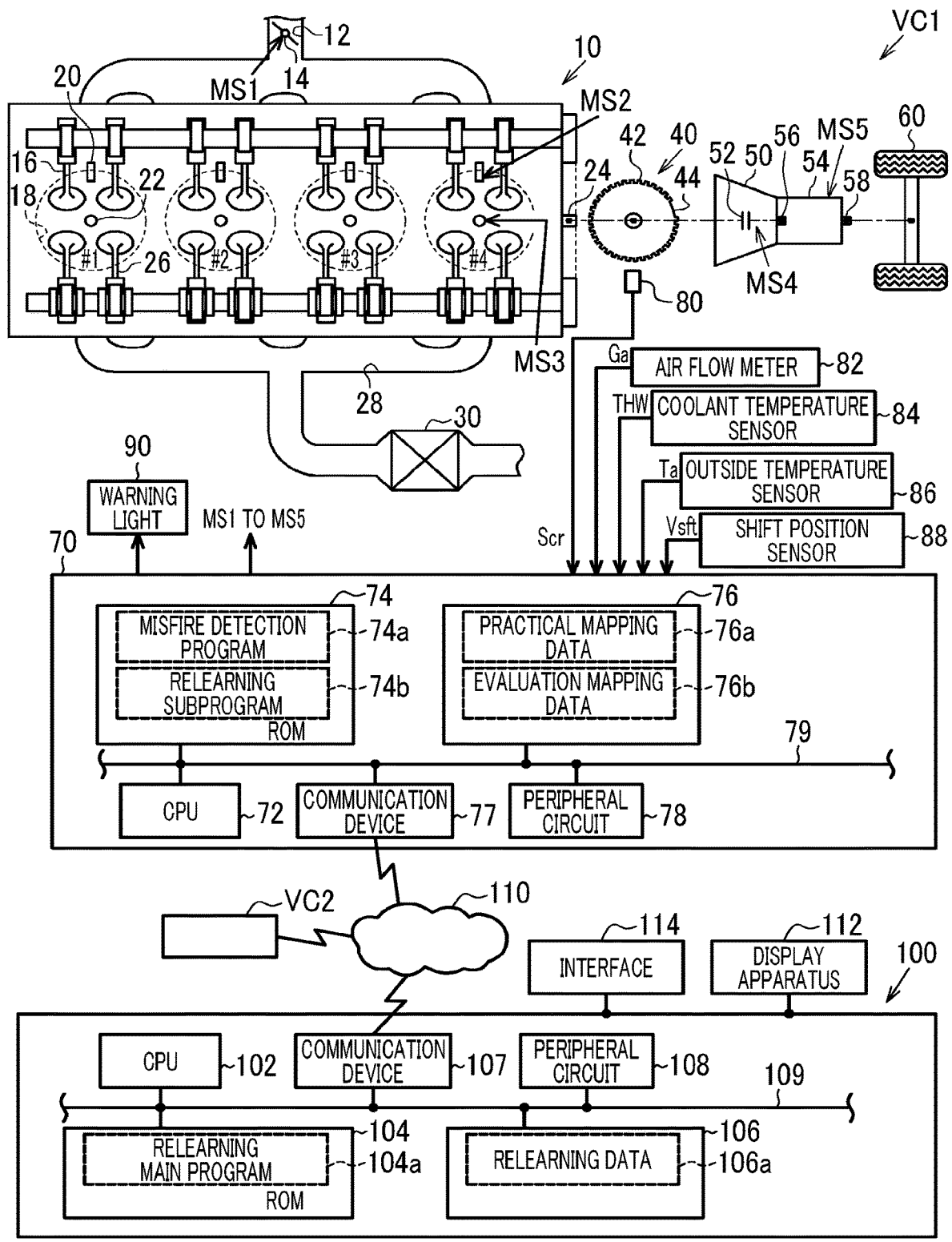
FIG. 1 is a diagram illustrating a configuration of a learning control system according to a first embodiment.

Hereinafter, a first embodiment of a misfire detection system will be described with reference to the drawings. In an internal combustion engine 10 mounted on a vehicle VC1 shown in FIG. 1, a throttle valve 14 is provided in an intake passage 12. The air sucked from the intake passage 12 flows into combustion chambers 18 of cylinders #1 to #4 when an intake valve 16 opens. Fuel is injected into the combustion chamber 18 by a fuel injection valve 20. In the combustion chamber 18, an air-fuel mixture of air and fuel is provided for combustion by spark discharge of an ignition device 22, and energy generated by the combustion is taken out as rotational energy of a crankshaft 24. The air-fuel mixture supplied for the combustion is discharged to an exhaust passage 28 as exhaust, with the opening of the exhaust valve 26. A catalyst 30 having oxygen storage capacity is provided in the exhaust passage 28.

An input shaft 56 of a transmission 54 can be connected to the crankshaft 24 of the internal combustion engine 10 via a torque converter 50. The torque converter 50 includes a lock-up clutch 52, and the crankshaft 24 and the input shaft 56 are connected when the lock-up clutch 52 enters the engagement state. A drive wheel 60 is mechanically connected to an output shaft 58 of the transmission 54.

The crankshaft 24 is coupled to a crank rotor 40 provided with teeth 42 indicating each of a plurality of rotation angles of the crankshaft 24. In the present embodiment, 34 teeth 42 are illustrated. Basically, the crank rotor 40 is provided with the teeth 42 at 10° C.A intervals, but one missing tooth 44 where the interval between adjacent teeth 42 is 30° C.A is provided. This is to indicate the reference rotation angle of the crankshaft 24.

The control device 70 operates the operation units of the internal combustion engine 10, such as the throttle valve 14, the fuel injection valve 20, and the ignition device 22, in order to control the torque, the exhaust component ratio, or the like which are control amounts of the internal combustion engine 10 as an object to be controlled. The control device 70 operates the lock-up clutch 52 in order to control the engagement state of the lock-up clutch 52, which is a control amount of the torque converter 50 as an object to be controlled. The control device 70 operates the transmission 54 to control a gear ratio, which is a control amount of the transmission 54 to be controlled. FIG. 1 shows operation signals MS1 to MS5 of the throttle valve 14, the fuel injection valve 20, the ignition device 22, the lock-up clutch 52, and the transmission 54, respectively.

When controlling the control amount, the control device 70 refers to an output signal Scr of the crank angle sensor 80 which outputs a pulse for each angular interval between the teeth 42 provided at every 10° C.A except for the missing tooth 44, and the intake air amount Ga detected by an air flow meter 82. The control device 70 refers to the coolant temperature THW which is the temperature of the coolant of the internal combustion engine 10 detected by the coolant temperature sensor 84, the outside air temperature Ta detected by the outside temperature sensor 86, and the shift position Vsft of the transmission 54 detected by the shift position sensor 88.

The control device 70 includes a CPU 72, a ROM 74, a storage device 76 which is an electrically rewritable nonvolatile memory, a communication device 77, and a peripheral circuit 78, which can communicate with each other via a local network 79. The peripheral circuit 78 includes a circuit that generates a clock signal that defines an internal operation, a power supply circuit, a reset circuit, or the like. The storage device 76 stores practical mapping data 76a and evaluation mapping data 76b. Here, the practical mapping data 76a is data actually used for monitoring misfire of the internal combustion engine 10. On the other hand, the evaluation mapping data 76b is data of which reliability is to be evaluated, and is not used for monitoring misfire of the internal combustion engine 10. The evaluation mapping data 76b is mounted on the control device 70 after learning to some extent by machine learning.

The control device 70 controls the control amount by causing the CPU 72 to execute a program stored in the ROM 74. Specifically, the ROM 74 stores a misfire detection program 74a and a relearning subprogram 74b. Here, the relearning subprogram 74b is a program for executing relearning of the evaluation mapping data 76b.

The communication device 77 is a device for communicating with the data analysis center 100 via the network 110 outside the vehicle VC1. The data analysis center 100 analyzes data transmitted from the vehicles VC1, VC2, . . . . The data analysis center 100 includes a CPU 102, a ROM 104, a storage device 106, a communication device 107, and a peripheral circuit 108, and these can be communicated via a local network 109. The ROM 104 stores a relearning main program 104a that defines a process of generating data for relearning the evaluation mapping data 76b, based on data transmitted from the vehicles VC1, VC2, . . . . The storage device 106 stores relearning data 106a transmitted from a plurality of vehicles VC1, VC2, . . . for relearning the mapping defined by the evaluation mapping data 76b.

Figure 2:
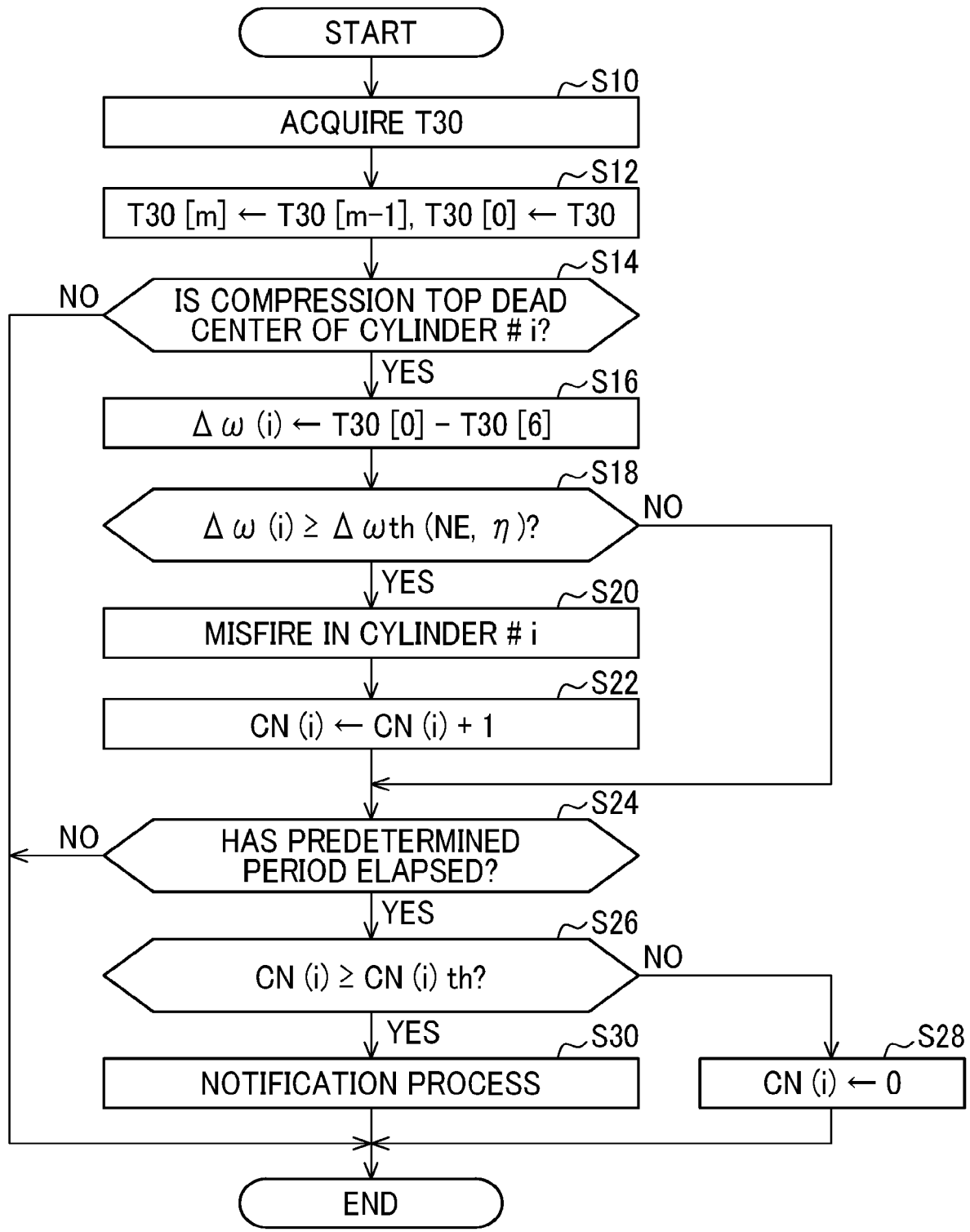
FIG. 2 is a flowchart illustrating a procedure of a process executed by a control device according to the first embodiment.

FIG. 2 shows a part of a process realized by the CPU 72 executing the misfire detection program 74a stored in the ROM 74. The process shown in FIG. 2 is a process using the practical mapping data 76a. The process shown in FIG. 2 is repeatedly executed, for example, at a predetermined cycle. In the following, the step number of each process is represented by a number prefixed with "S".

In the series of processes shown in FIG. 2, the CPU 72 first acquires a minute rotation time T30 (S10). The minute rotation time T30 is a time for the crankshaft 24 to rotate by 30° C.A, and is calculated by the CPU 72 based on the output signal Scr of the crank angle sensor 80. Next, the CPU 72 sets the latest minute rotation time T30 acquired in the process of S10 to the minute rotation time T30[0], and sets the variable "m" of the minute rotation time T30[m] to a larger value as the value is earlier (S12). That is, assuming that "m 1, 2, 3, . . . ", the minute rotation time T30[m−1] immediately before the process of S12 is performed is set to the minute rotation time T30[m]. Thereby, for example, the minute rotation time T30 acquired by the process of S10 when the process of FIG. 2 is executed last time becomes the minute rotation time T30[1]. Among the minute rotation times T30[0], T30[1], T30[2], . . . , the minute rotation times T30 that are adjacent to each other in time series indicate times for rotation by an angular interval of 30° C.A adjacent to each other, and the angular intervals do not have overlapping parts.

Next, the CPU 72 determines whether or not the minute rotation time T30 acquired in the process of S10 is time for rotation by an angular interval from 30° C.A before the compression top dead center of any of the cylinders #1 to #4 to the compression top dead center (S14). In a case where the CPU 72 determines that it is the time for the rotation by the angular interval up to the compression top dead center (S14. YES), in order to determine the presence or absence of misfire in the cylinder at the compression top dead center, the CPU 72 puts "T30[0]-T30[6]" into the rotation fluctuation amount $\Delta\omega(i)$ of the cylinder #i to be determined (S16). That is, the rotation fluctuation amount $\Delta\omega$ is quantified by subtracting the time for rotation by an angular interval from 30° C.A before the compression top dead center to the compression top dead center of the preceding cylinder of the cylinder to be subjected to misfire determination to the compression top dead center, from the time for rotation by an angular interval from 30° C.A before the compression top dead center to the compression top dead center of the cylinder to be subjected to misfire determination.

Next, the CPU 72 determines whether or not the rotation fluctuation amount Δω(i) is equal to or larger than the specified amount Δωth (S18). This process is a process of determining whether or not a misfire has occurred in a cylinder to be subjected to misfire determination. Here, the CPU 72 variably sets the specified amount Δωth, based on the rotation speed NE and the charging efficiency η.

More specifically, the CPU 72 performs a map calculation of the specified amount Δωth in a state where map data using the rotation speed NE and the charging efficiency η as input variables and the specified amount Δωth as an output variable is stored in the storage device 76 in advance. The map data is set data of discrete values of the input variables and the values of the output variables corresponding to the values of the input variables. For example, the map calculation may be a process in which the values of the output variables of the corresponding map data is the calculation result, when the value of the input variable matches any one of the values of the input variables in the map data, and values obtained by interpolating values of a plurality of output variables included in map data are the calculation results, in a case of mismatch.

Incidentally, the rotation speed NE is calculated by the CPU 72 based on the output signal Scr of the crank angle sensor 80. Here, the rotation speed NE is an average value of the rotation speed when the crankshaft 24 rotates by an angular interval larger than the appearance interval of the compression top dead center (180° C.A in the present embodiment). The rotation speed NE is desirably an average value of the rotation speed when the crankshaft 24 rotates by the rotation angle of one or more rotations of the crankshaft 24. The average value here is not limited to the simple average, but may be, for example, an exponential moving average, or in short, a value in which the low-frequency component is obtained by removing the higher-order component fluctuating as much as the appearance interval of the compression top dead center. The charging efficiency η is calculated by the CPU 72 based on the rotation speed NE and the intake air amount Ga.

The process of S16 and S18 is a process using the practical mapping data 76*a*. That is, the practical mapping data 76*a* defines a mapping of receiving the minute rotation time T30[0] and the minute rotation time T30[6] and outputting a logical value corresponding to the occurrence of misfire in the cylinder to be determined as an output value. The logical value here is a value related to whether the proposition that the rotation fluctuation amount Δω(i) is equal to or greater than the specified amount Δωth is true or false.

When determining that the rotation fluctuation amount Δω(i) is equal to or greater than the specified amount Δωth (S18: YES), the CPU 72 determines that a misfire has occurred in the cylinder #i (S20). Next, the CPU 72 increments the misfire counter CN(i) of the cylinder #i (S22). Then, the CPU 72 determines whether or not the logical sum of the facts that a predetermined period has elapsed since the process of S18 is first performed in a state where the misfire counter CN(i) has been initialized and that a predetermined period has elapsed since the process of S28 described below is performed is true (S24). When determining that the logical sum is true (S24: YES), the CPU 72 determines whether or not the misfire counter CN(i) is equal to or larger than the threshold CNth (S26). When determining that the value is less than the threshold value CNth (S26: NO), the CPU 72 initializes the misfire counter CN(i) (S28).

On the other hand, in a case where the CPU 72 determines that the difference is equal to or larger than the threshold CNth (S26: YES), the CPU 72 operates the warning light 90 shown in FIG. 1 to notify the user that an abnormality has occurred (S30). The CPU 72 temporarily ends the series of processes shown in FIG. 2 once, when the processes of S28 and S30 are completed, or when a negative determination is made in the processes of S14 and S24.

Figure 3:
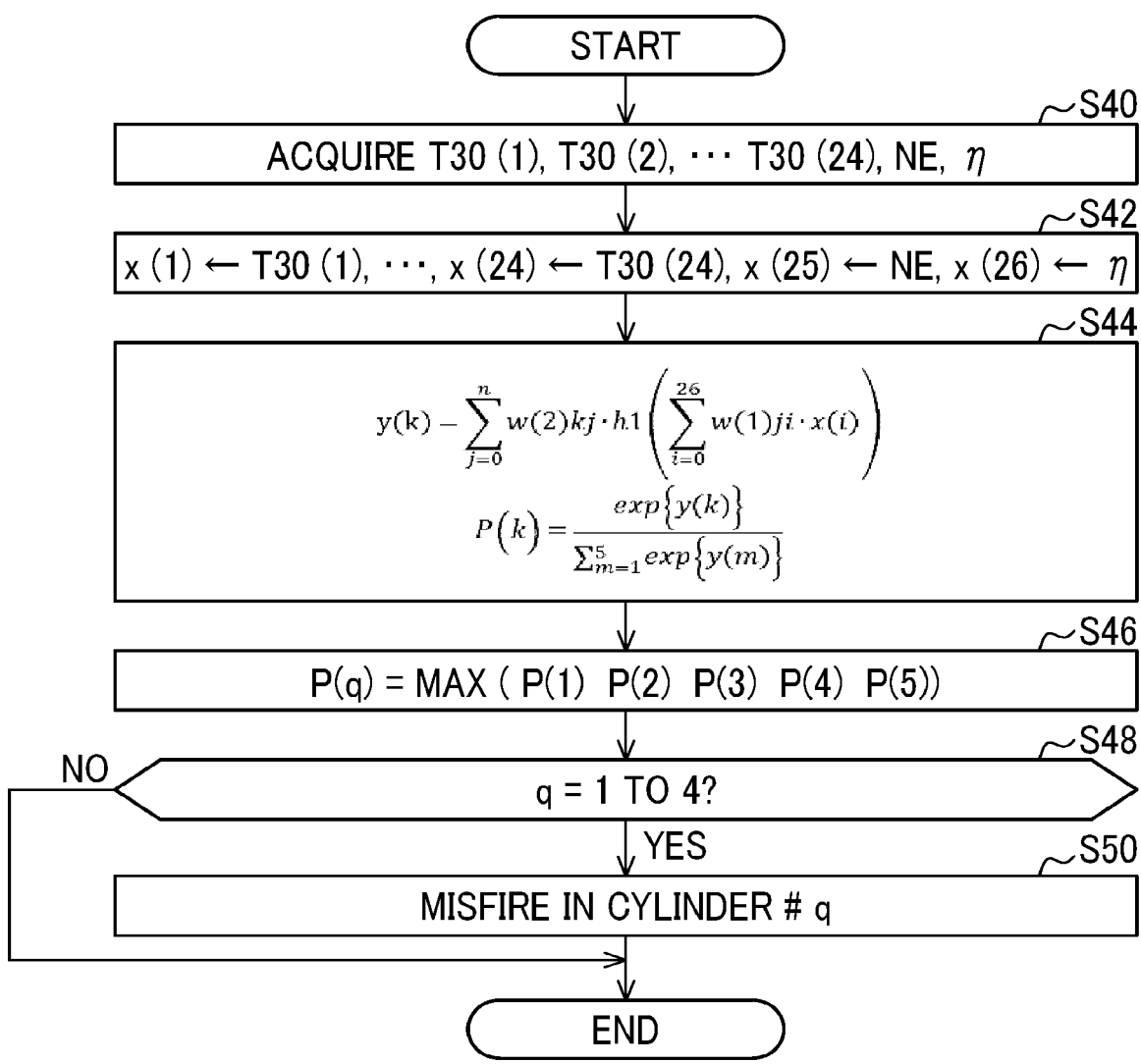
FIG. 3 is a flowchart illustrating a procedure of the process executed by the control device according to the first embodiment.

FIG. 3 shows a partial procedure of a process realized by the CPU 72 executing the misfire detection program 74*a* stored in the ROM 74. The process shown in FIG. 3 is a process using the evaluation mapping data 76*b*.

In the series of processes shown in FIG. 3, the CPU 72 first acquires the minute rotation times T30(1), T30(2), . . . T30(24), the rotation speed NE, and the charging efficiency η (S40). Here, the minute rotation times T30(1), T30(2), . . . are different from the minute rotation times T30[1], T30[2], . . . illustrated in FIG. 2. In particular, the minute rotation times T30(1), T30(2), . . . have later values as the numbers in parentheses are larger. The minute rotation times T30(1) to T30(24) are rotation times at 24 angular intervals obtained by equally dividing the rotation angle region of 720° C.A by 30° C.A.

Next, the CPU 72 puts the values obtained by the process of S40 into the input variables x(1) to x(26) of the mapping defined by the evaluation mapping data 76*b* (S42). More specifically, the CPU 72 sets "s=1 to 24" and puts the minute rotation time T30(s) for the input variable x(s). That is, the input variables x(1) to x(24) are time-series data of the minute rotation time T30. The CPU 72 puts the rotation speed NE for the input variable x(25) and puts the charging efficiency η for the input variable x(26).

Next, the CPU 72 calculates the values of the misfire variables P(1) to P(5) by inputting the input variables x(1) to x(26) into the mapping defined by the evaluation mapping data 76*b* (S44). Here, assuming that "i=1 to 4", the misfire variable P(i) is a variable having a larger value when the probability of the occurrence of misfire in the cylinder #i is higher than when the probability is lower. The misfire variable P(5) is a variable having a larger value when the probability of the occurrence of no misfire in any of the cylinders #1 to #4 is higher than when the probability is lower.

More specifically, the mapping defined by the evaluation mapping data 76*b* is a neural network having a single intermediate layer. The neural network described above has coefficients w(1)*ji* (j=0 to n, i=0 to 26) and an activation function h1(x) which is non-linear mapping for non-linear conversion of the output of linear mapping defined by the coefficients w(1)*ji*. In the present embodiment, a hyperbolic tangent is exemplified as the activation function h1(x). Incidentally, w(1)*j*0 or the like is a bias parameter, and the input variable x(0) is defined as "1".

The neural network includes a softmax function for receiving coefficients w(2)*kj* (k=1 to 5, j=0 to n) and prototype variables y(1) to y(5) which are outputs of a linear mapping defined by the coefficient w(2)*kj* as inputs, and outputting misfire variables P(1) to P(5).

Next, the CPU 72 specifies the largest one among the misfire variables P(1) to P(5) (S46). Then, the CPU 72 determines whether the maximum misfire variable P(q) is any of the misfire variables P(1) to P(4) or the misfire variable P(5) (S48). When determining that the maximum misfire variable P(q) is any of the misfire variables P(1) to P(4) (S48: YES), the CPU 72 determines that misfire occurs in the cylinder #q (S50).

Figure 4:
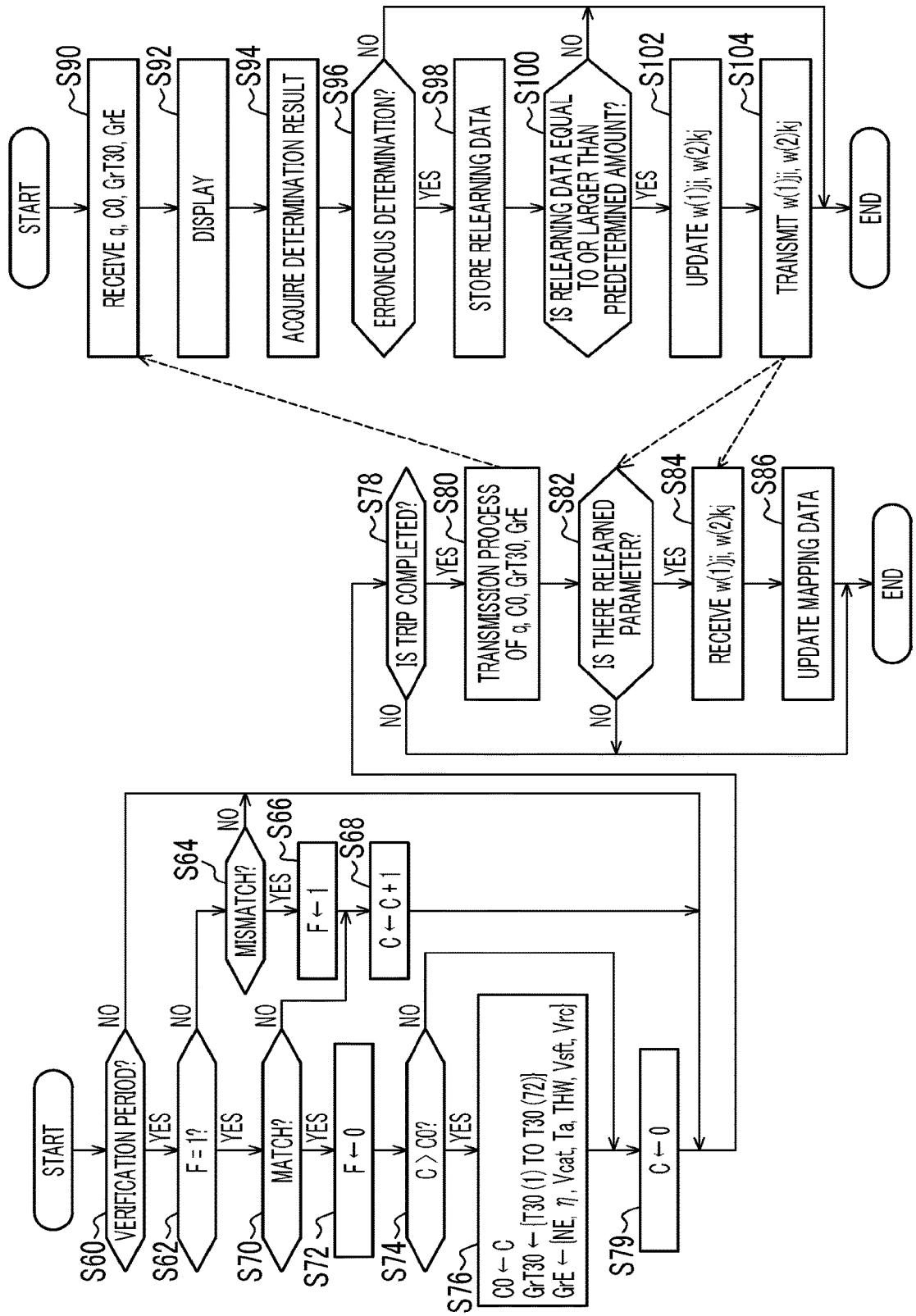
FIG. 4 is a flowchart illustrating a procedure of a process executed by the system according to the first embodiment.

The CPU 72 temporarily ends the series of processes shown in FIG. 3 once, when the process of S50 is completed, or when a negative determination is made in the process of S48. FIG. 4 shows a procedure of a process related to relearning of the evaluation mapping data 76b according to the present embodiment. The process shown on the left side of FIG. 4 is realized by the CPU 72 executing the relearning subprogram 74b stored in the ROM 74 shown in FIG. 1. The process shown on the right side of FIG. 4 is realized by the CPU 102 executing the relearning main program 104a stored in the ROM 104. Hereinafter, the process illustrated in FIG. 4 will be described along the time series of the relearning process.

In the series of processes shown on the left side of FIG. 4, the CPU 72 first determines whether or not it is the reliability verification period of the evaluation mapping data 76b (S60). Specifically, in the present embodiment, the following periods are set as verification periods.

(A) a Period when the Coolant Temperature THW is Equal to or Lower than a Predetermined Temperature:

When the coolant temperature THW is low, the combustion tends to be unstable, and it is difficult to improve the misfire detection accuracy as compared with the case where the coolant temperature THW is high, so that this period is included in the verification period.

(B) A Period when the Outside Air Temperature Ta is Equal to or Lower than a Defined Temperature:

When the outside air temperature Ta is low, the combustion tends to be unstable, and it is difficult to improve the misfire detection accuracy as compared with the case where the outside air temperature Ta is high, so that this period is included in the verification period.

(C) Execution Period of the Warm-Up Process of the Catalyst 30:

During the execution period of the warm-up process of the catalyst 30, since the combustion is performed with reduced combustion efficiency, the combustion tends to be unstable, and it is difficult to improve the misfire detection accuracy than after the catalyst 30 is warmed up, so that this period is included in the verification period.

(D) A Period when the Charging Efficiency η is Equal to or Less than a predetermined value:

When the load is light, the combustion tends to be unstable than when the load is heavy, and it is difficult to improve the misfire detection accuracy than when the load is medium or high, so that this period is included in the verification period.

(E) A Period in which the Amount of Change ΔNE in the Rotation Speed NE Per Predetermined Time is Equal to or More than a Predetermined Value:

During the transient operation, the misfire detection accuracy tends to be lower than in the steady operation, so that this period is included in the verification period.

When determination is made that it is the verification period (S60: YES), the CPU 72 determines whether or not the flag F is "1" (S62). Here, the flag F becomes "1" when the misfire determination result obtained by the process shown in FIG. 2 and the misfire determination result obtained by the process shown in FIG. 3 do not match, and the flag F becomes "0" when the misfire determination results match. When determination is made that the flag F is "0" (S62: NO), the CPU 72 determines whether or not the misfire determination result by the process shown in FIG. 2 does not match the misfire determination result obtained by the process shown in FIG. 3 (S64). The CPU 72 determines that there is mismatch when four determination results obtained by the process of step S18 of FIG. 2 in the same combustion cycle do not match the result of the process of step S46 in FIG. 3. That is, P(5) is selected in the process of S46, for example, although determination is made in the process of S18 that the rotation fluctuation amount Δω(1) of the cylinder #1 is equal to or larger than the specified amount Δωth, the CPU 72 determines that the results do not match.

When determining that the results do not match (S64: YES), the CPU 72 puts "1" for the flag F (S66). Next, the CPU 72 increments the counter C (S68). On the other hand, when determination is made that the flag F is "1" (S62: YES), the CPU 72 determines whether or not the misfire determination result by the process shown in FIG. 2 and the misfire determination result obtained by the process shown in FIG. 3 match (S70). When determining that the results do not match (S70: NO), the CPU 72 proceeds to the process of S68, and when determining that the results match (S70: YES), the CPU 72 puts "0" into the flag F (S72). Then, the CPU 72 determines whether or not the counter C has a value larger than the maximum value C0 (S74). The maximum value C0 is the maximum number of consecutive times in which determination is made that the determination result using the practical mapping data 76a and the determination result using the evaluation mapping data 76b do not match. When determination is made that the value is larger than the maximum value C0 (S74: YES), the CPU 72 updates the maximum value C0 to the current value of the counter C, and updates the rotation time set GrT30 and the extra information set GrE (S76).

Figure 5:
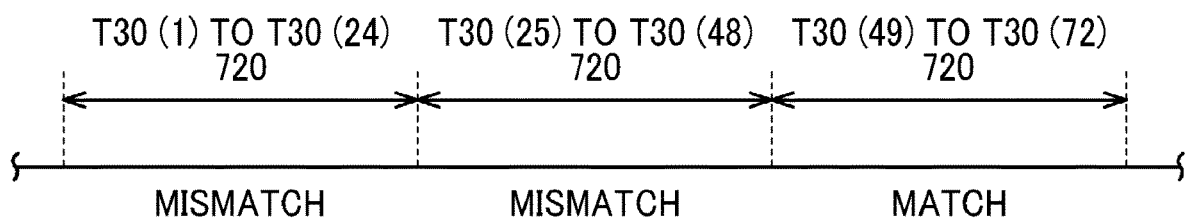
FIG. 5 is a view illustrating transmission data according to the first embodiment.

Specifically, the rotation time set GrT30 is a set of minute rotation times T30(1) to T30(72) for three combustion cycles, as shown in FIG. 5. However, the minute rotation times T30(49) to T30(72) is updated so as to correspond to the combustion cycle in which determination is made in the latest process of S70 that the misfire determination result obtained by the process shown in FIG. 2 matches the misfire determination result obtained by the process shown in FIG. 3. Here, when the maximum value C0 is equal to or more than "2", the minute rotation times T30(1) to T30(24) and the minute rotation times T30(25) to T30(48) all correspond to the combustion cycle in which the misfire determination result obtained by the process shown in FIG. 2 and the misfire determination result obtained by the process shown in FIG. 3 are different from each other. The initial value of the maximum value C0 is zero.

The extra information set GrE includes a rotation speed NE, a charging efficiency η, a warm-up control variable Vcat indicating whether or not a warm-up process of the catalyst 30 is performed, an outside air temperature Ta, a coolant temperature THW, a shift position Vsft of the transmission 54, and an engagement variable Vrc which is a variable indicating the engagement state of the lock-up clutch 52. It is desirable that each of these variables is a value in the combustion cycle before the combustion cycle for which the affirmative determination has been made in the process of S70. The extra information set GrE is a set of variables that affect the rotation behavior of the crankshaft 24 according to the presence or absence of misfire, in addition to the rotation speed NE and the charging efficiency η as operating point variables which are inputs to the mapping defined by the evaluation mapping data 76b. That is, since the inertia constant from the crankshaft 24 to the drive wheels 60 varies depending on the engagement state and the shift position Vsft of the lock-up clutch 52, the rotation behavior of the crankshaft 24 becomes different.

The warm-up control variable Vcat, the outside air temperature Ta, and the coolant temperature THW are variables indicating whether or not the combustion state is stable.

Returning to FIG. 4, when the process of S76 is completed or when a negative determination is made in the process of S74, the CPU 72 initializes the counter C (S79). Then, when the processes of S68 and S79 are completed, or when a negative determination is made in the processes of S60 and S64, the CPU 72 determines whether or not it is the end time of the trip (S78). Here, the trip is one period in which the traveling permission signal of the vehicle is in the ON state. In the present embodiment, the traveling permission signal corresponds to an ignition signal. When determining that it is the end time of the trip (S78: YES), the CPU 72 operates the communication device 77 to transmit information "q" regarding the largest one among the misfire variables P(1) to P(5), the maximum value C0, the rotation time set GrT30, and the extra information set GrE to the data analysis center 100 (S80).

As described above, in the present embodiment, once per trip, the minute rotation time T30 for two combustion cycles corresponding to the maximum value C0 and the minute rotation time T30 for one combustion cycle adjacent to the same combustion cycle are transmitted. This is because when the number of consecutive times in which the determination result using the practical mapping data 76a and the determination result using the evaluation mapping data 76b do not match is large, compared to single-time mismatch, it is highly likely that useful information for verifying the reliability of the evaluation mapping data 76b is included. Therefore, it is possible to transmit useful information while reducing the amount of transmission data as compared with transmitting the minute rotation time T30 of all the combustion cycles when a determination is made that there is mismatch in one trip. The maximum value C0 is initialized at the start of a new trip.

On the other hand, as shown on the right side of FIG. 4, the CPU 102 receives the information "q" regarding the largest one among the misfire variables P(1) to P(5), the maximum value C0, the rotation time set GrT30, and the extra information set GrE (S90). The CPU 102 displays, on the display apparatus 112 shown in FIG. 1, waveform data on the rotation behavior of the crankshaft 24 represented by the rotation time set GrT30, and displays the information "q" regarding the largest one among the misfire variables P(1) to P(5), the maximum value C0, and the extra information set GrE (S92). This is a process of providing a skilled person with information that allows the skilled person to determine whether or not a misfire has occurred. That is, the skilled person can determine with high accuracy whether or not a misfire has occurred by visually recognizing the waveform data. At that time, by referring to the information of the extra information set GrE, the determination as to whether or not a misfire has occurred becomes more reliable. Thereby, the skilled person can determine whether or not the misfire determination using the evaluation mapping data 76b is an erroneous determination, based on the determination of whether or not a misfire has occurred.

When a determination result is input by a skilled person operating the interface 114 shown in FIG. 1, the CPU 102 acquires the determination result (S94). Then, the CPU 102 determines whether or not the determination result input by the operation of the interface 114 is a determination that the misfire determination using the evaluation mapping data 76b is an erroneous determination (S96). When determination is that the determination is an erroneous determination (S96: YES), the CPU 102 stores at least the minute rotation times T30(25) to T30(48), the rotation speed NE, and the charging efficiency 11, and the result of the determination by a skilled person as to whether or not a misfire has occurred, among the data received in the process of S90, as the relearning data 106a (S98). The relearning data 106a includes data based on data received from the vehicle VC1 as well as other vehicles VC2, . . . equipped with an internal combustion engine having the same specifications as the internal combustion engine 10.

Next, the CPU 102 determines whether or not the relearning data 106a stored in the storage device 106 is equal to or larger than a predetermined amount (S100). When determination is made that the amount is equal to or larger than the predetermined amount (S100: YES), the CPU 102 updates the coefficients w(1)ji, w(2)kj which are learned parameters of the evaluation mapping data 76b, using the relearning data 106a as training data (S102). That is, the CPU 72 calculates the misfire variables P(1) to P(5) by using as the input variables x(1) to x(26), data other than the data regarding the result of the determination by the skilled person as to whether or not it is the misfire, among the training data, and generates teacher data based on the data on the result of the determination by the skilled person as to whether or not it is misfire. For example, when the skilled person determines that misfire occurs in the cylinder #1, P(1)=1 and P(2) to P(5)=0. For example, when the skilled person makes a determination that it is normal, P(1) to P(4)=0 and P(5)=1. Then, the coefficients w(1)ji, w(2)kj are updated by a known method such that the absolute value of the difference between the teacher data and the misfire variables P(1) to P(5) output from the neural network becomes small (S102).

In the calculation process of the misfire variables P(1) to P(5), information on the coefficients w(1)ji and w(2)kj, and the information indicating that the activation function h1, and the softmax function in the output layer of the neural network are used is needed. Regarding this, for example, when an affirmative determination is made in the process of S100, an instruction to transmit data on these may be output from the CPU 102 to the control device 70, or may be stored in the storage device 106 in advance, for example.

Then, the CPU 102 operates the communication device 107 to transmit the updated coefficients w (1)ji, w(2)kj to the vehicles VC1, VC2, . . . as relearned parameters (S104). When the process of S104 is completed, or when a negative determination is made in the processes of S96 and S100, the CPU 102 temporarily ends a series of processes illustrated on the right side of FIG. 4.

On the other hand, as shown on the left side of FIG. 4, the CPU 72 determines whether or not there is transmission of a relearned parameter from the data analysis center 100 (S82). Then, when determination is made that there is the relearned parameter (S82: YES), the CPU 102 receives coefficients w(1)ji and w(2)kj (S84), and updates the evaluation mapping data 76b stored in the storage device 76 (S86).

When the process of S86 is completed, or when a negative determination is made in the processes of S78 and S82, the CPU 72 temporarily ends a series of processes illustrated on the left side of FIG. 4. Here, the operation and effect of the present embodiment will be described.

The CPU 72 monitors the presence or absence of a misfire of the internal combustion engine 10 by executing the process shown in FIG. 2, based on the practical mapping data 76a, and when frequent misfire occurs, the CPU 72 executes a notification process to deal with the frequent occurrence of the misfire. Based on the evaluation mapping data 76b, the CPU 72 executes the process shown in FIG. 3 to execute a misfire determination based on the evaluation mapping data 76b. Then, the CPU 72 determines whether or not the misfire determination result using the evaluation mapping data 76b matches the misfire determination result using the practical mapping data 76a. When a determination is made that there is mismatch, the CPU 72 counts the number of times that the mismatching state continuously appears, and calculates the maximum value C0.

Figure 6:
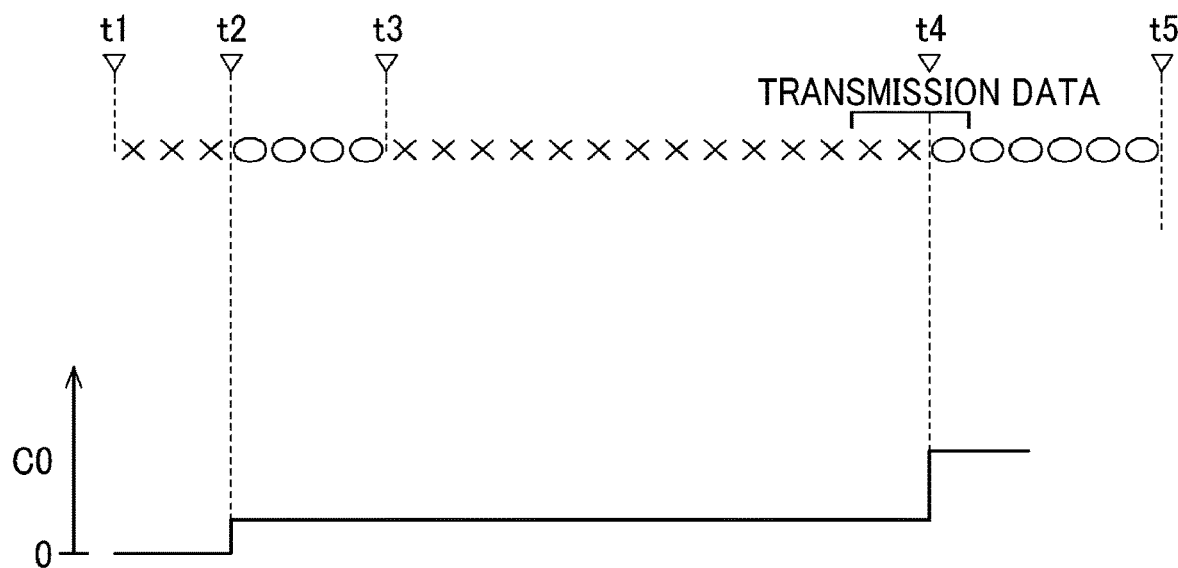
FIG. 6 is a time chart illustrating a transition of a maximum value C0 according to the first embodiment.

FIG. 6 shows the transition of the maximum value C0. In FIG. 6, "O" indicates a combustion cycle in which a misfire determination result using the evaluation mapping data 76b and a misfire determination result using the practical mapping data 76a are determined to match, and "x" indicates a combustion cycle determined to mismatch.

As shown in FIG. 6, during a period from time t1 to time 2 when the maximum value C0 is the initial value "0" before time t2, the number of consecutive combustion cycles when a determination is made that there is mismatch is three, and thereafter, when returning to the state where a determination is made that there is match, the CPU 72 sets the maximum value C0 to "3". Thereafter, during a period from time t3 to time t4, the number of consecutive combustion cycles where a determination is made that there is mismatch is 14, and thereafter, when returning to the state where a determination is made that there is match, the CPU 72 updates the maximum value C0 to "14".

Then, when the trip ends at time t5, the CPU 72 transmits input data for three combustion cycles including the last two combustion cycles in the period when a determination is made that there are 14 consecutive mismatches, which corresponds to the maximum value C0, and one combustion cycle when returning to the state where a determination is made that there is match.

On the other hand, the CPU 102 displays the input data or the like transmitted from the CPU 72 on the display apparatus 112. Thereby, the skilled person determines whether or not a misfire has occurred, based on waveform data or the like indicating the rotation behavior of the crankshaft 24, and based on this, determines whether or not the determination of the presence or absence of a misfire using the evaluation mapping data 76b is an erroneous determination. When the determination result by the skilled person indicates that the determination as to the presence or absence of misfire using the evaluation mapping data 76b is an erroneous determination, the CPU 102 stores a part of the data transmitted from the vehicle side as relearning data 106a in the storage device 106. When the relearning data 106a becomes equal to or more than the predetermined amount, the CPU 102 updates the coefficients w(1)ji, w(2)kj and transmits the relearning data to each of the vehicles VC1, VC2, . . . .

Thus, in each of the vehicles VC1, VC2, . . . , the evaluation mapping data 76b is updated with the coefficients w(1)ji and w(2)kj updated by using the data that causes the erroneous determination by using the evaluation mapping data 76b in its own vehicle, as well as the data that causes the erroneous determination by using the evaluation mapping data 76b in the other vehicles.

Therefore, the evaluation mapping data 76b can be updated to data by which misfire can be determined in various situations with high accuracy. In a case where determination is made that the evaluation mapping data 76b has higher reliability by the skilled person's determination when the mismatch occurs, the updated evaluation mapping data 76b can be used as the practical mapping data 76a to monitor misfire. The learned model (mapping data) based on the raw data installed on the vehicles VC1, VC2, . . . can be installed as practical mapping data from the beginning on a newly developed control device mounted on a vehicle equipped with an internal combustion engine having the same number of cylinders.

According to the present embodiment described above, the following effects can be further obtained. (1) When mismatch occurs between the determination result based on the practical mapping data 76a and the determination result based on the evaluation mapping data 76b, the minute rotation times T30 (25) to T30 (48) in the mismatched combustion cycle, as well as the minute rotation times T30 (49) to T30 (72) in the combustion cycle that has been restored from mismatch to match are transmitted to the data analysis center 100. Thereby, the information about the state where the mismatch has occurred as well as the information at the time of transition to the state where the mismatch has been resolved is transmitted. Therefore, as compared with the case where solely the minute rotation times T30 (25) to T30 (48), which are the waveform data of one mismatched combustion cycle, are transmitted, the skilled person can more accurately determine whether or not misfire has occurred.

(2) When mismatch occurs between the determination result based on the practical mapping data 76a and the determination result based on the evaluation mapping data 76b, the extra information set GrE is also transmitted. Thus, as compared with the case where solely the minute rotation times T30 (1) to T30 (72), which are the waveform data indicating the rotation behavior of the crankshaft 24, are transmitted, the skilled person can more accurately determine whether or not misfire has occurred.

(3) When mismatch occurs between the determination result based on the practical mapping data 76a and the determination result based on the evaluation mapping data 76b, the data when the mismatch occurs is transmitted to the data analysis center 100 at the end time of the trip. At the end time of the trip, since the calculation load of the control device 70 is smaller than when the vehicle is traveling, it is possible to suppress the calculation load applied to the control device 70 from being excessively increased in the transmission process.

Second Embodiment

Hereinafter, the second embodiment will be described with reference to the drawings, focusing on differences from the first embodiment.

Figure 7:
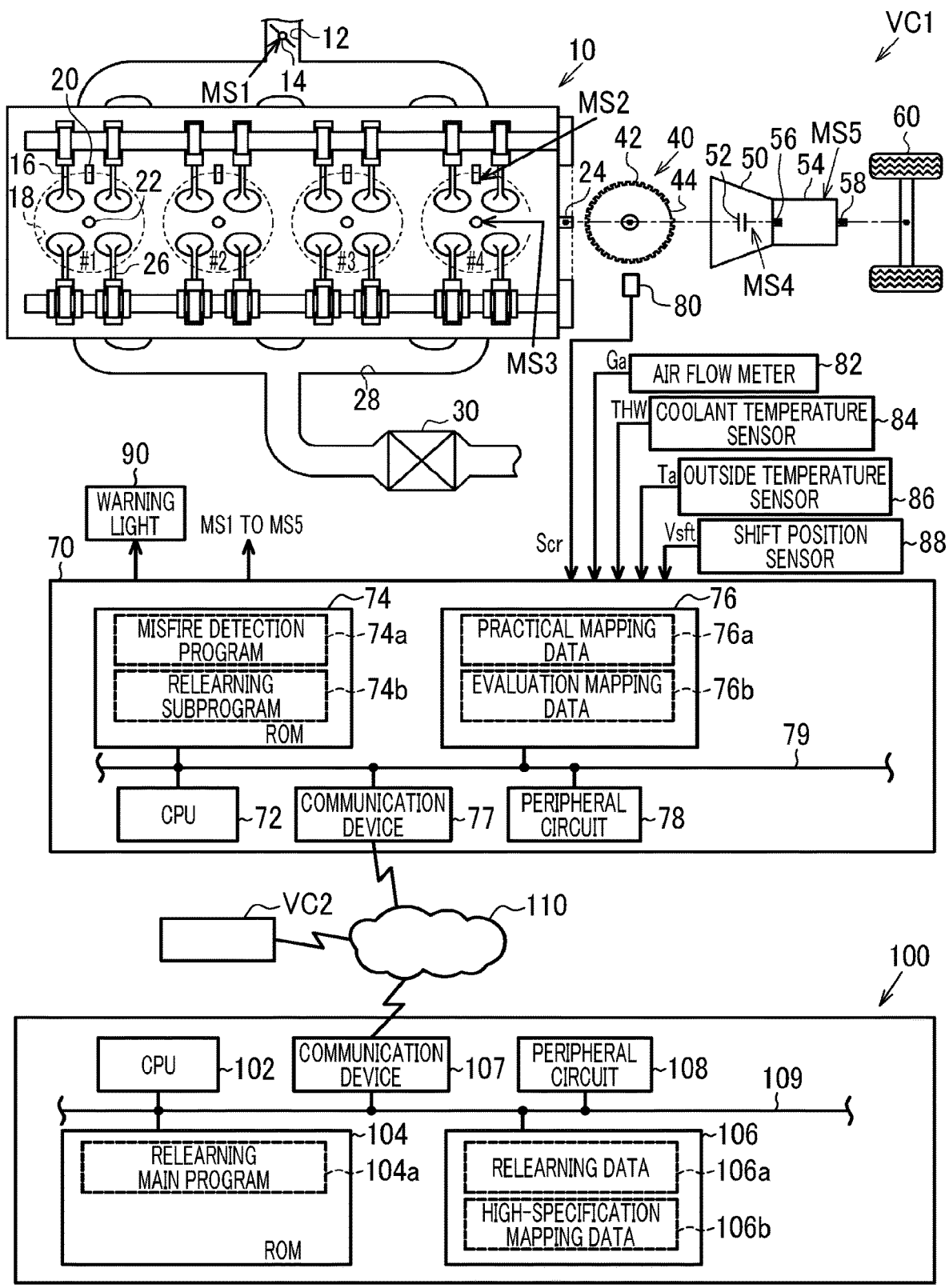
FIG. 7 is a diagram illustrating a configuration of a learning control system according to a second embodiment.

FIG. 7 shows a configuration of a misfire detection system according to the second embodiment. In FIG. 7, the same reference numbers are given to the members corresponding to the members shown in FIG. 1 for convenience. The storage device 106 shown in FIG. 7 stores high-specification mapping data 106b. In exchange for the large number of dimensions of the input variables and the complexity of the mapping structure, the high-specification mapping data 106b can be used to perform misfire determination simulating a skilled person. In learning the high-specification mapping data 106b, the rotation time set GrT30 and the extra information set GrE in the processing of FIG. 4 and the determination result of the skilled person by the processing of S94 and S96 are used as training data.

Figure 8:
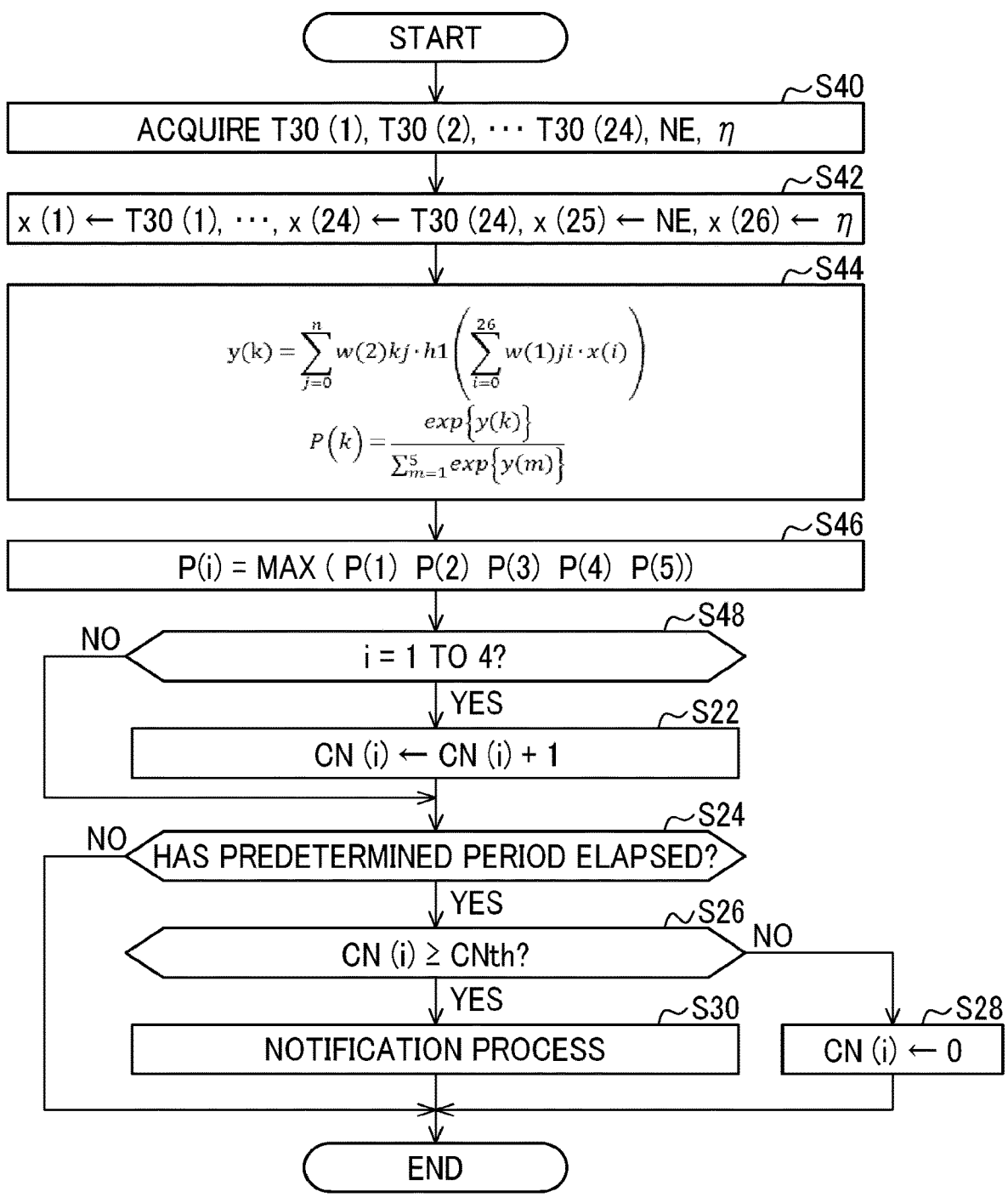
FIG. 8 is a flowchart illustrating a procedure of a process executed by a control device according to the second embodiment.

In the present embodiment, a case is shown in which the reliability of the evaluation mapping data 76b is improved by the process of the first embodiment, and the evaluation mapping data 76b is implemented as the practical mapping data 76a. FIG. 8 shows a part of a process realized by the CPU 72 executing the misfire detection program 74a stored in the ROM 74. The process shown in FIG. 8 is a process using the practical mapping data 76a. The process shown in FIG. 8 is repeatedly executed, for example, at a predetermined cycle. In FIG. 8, the same step numbers are given to the processes corresponding to the processes shown in FIGS. 2 and 3 for convenience.

In a series of processes shown in FIG. 8, the CPU 72 executes processes similar to the processes of S40 to S48 of FIG. 3. That is, in this embodiment, since the evaluation mapping data 76b used in the process of FIG. 3 is the practical mapping data 76a, the processes of S40 to S48 are executed using the practical mapping data 76a. In FIG. 8, the largest one among misfire variables P(1) to P(5) is described as misfire variable P(i), and is different from the misfire variable P(q) in FIG. 3 in description, but the process itself is the same.

When an affirmative determination is made in the process of S48, the CPU 72 executes the processes of S22 to S30 on the cylinder #i for which misfire is determined to have occurred, while when a negative determination is made in the process of S48, the CPU 72 executes the processes of S24 to S30.

Figure 9:
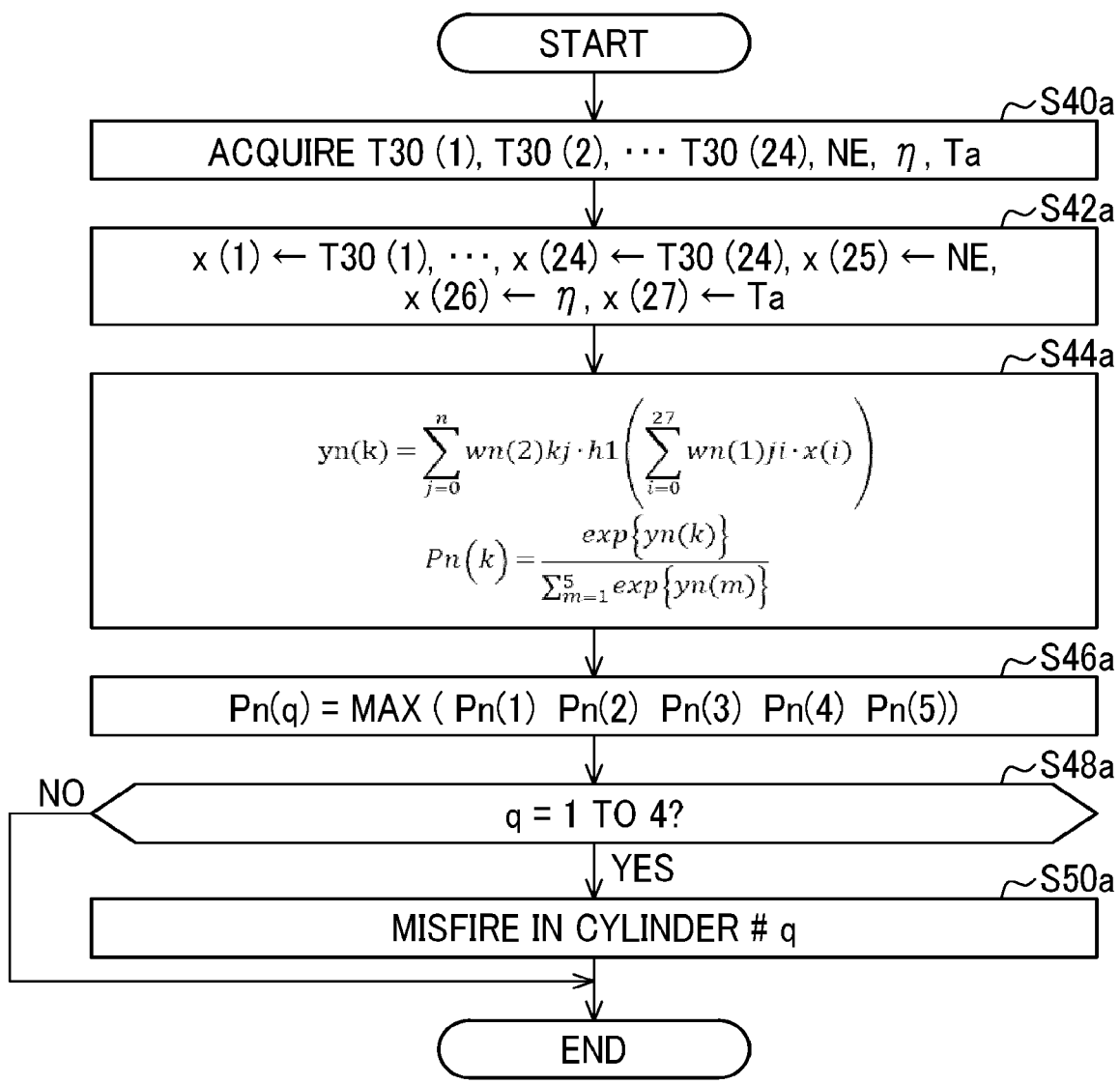
FIG. 9 is a flowchart illustrating a procedure of the process executed by the control device according to the second embodiment.

FIG. 9 shows a partial procedure of a process realized by the CPU 72 executing the misfire detection program 74a stored in the ROM 74. The process shown in FIG. 9 is a process using the evaluation mapping data 76b.

In the series of processes shown in FIG. 9, the CPU 72 first acquires the outside air temperature Ta in addition to the minute rotation times T30(1), T30(2), . . . T30(24), the rotation speed NE, and the charging efficiency η (S40a).

Next, the CPU 72 puts the values obtained by the process of S40a into the input variables x(1) to x(27) of the mapping defined by the evaluation mapping data 76b (S42a). More specifically, the CPU 72 executes the same process as the process of S42 on the input variables x(1) to x(26), and puts the outside air temperature Ta into the input variable x(27).

Next, the CPU 72 calculates the misfire variables Pn(1) to Pn(5) corresponding to the misfire variables P(1) to P(5), by inputting the input variables x(1) to x(27) into the mapping defined by the evaluation mapping data 76b (S44a). More specifically, the mapping defined by the evaluation mapping data 76b is a neural network having a single intermediate layer. The neural network described above has coefficients wn(1)ji (j=0 to n, i=0 to 27) and an activation function h1(x) which is an input side non-linear mapping for non-linear conversion of the output of a linear mapping defined by the coefficients w(1)ji. In the present embodiment, a hyperbolic tangent is exemplified as the activation function h1(x). Incidentally, wn(1)j0 or the like is a bias parameter, and the input variable x(0) is defined as "1".

The neural network includes a softmax function for receiving coefficients wn(2)kj (k=1 to 5, j=0 to n) and prototype variables yn(1) to yn(5) which are outputs of a linear mapping defined by the coefficient wn(2)kj as inputs, and outputting misfire variables Pn.

Then, the CPU 72 specifies the maximum misfire variable Pn(q) among the misfire variables Pn(1) to Pn(5) (S46a). Then, the CPU 72 determines whether or not the maximum misfire variable Pn(q) is any of "1 to 4" (S48a). Then, when determining that the maximum misfire variable Pn(q) is any one of "1 to 4" (S48a: YES), the CPU 72 determines that misfire occurs in the cylinder #q (S50a). The CPU 72 temporarily ends the series of processes illustrated in FIG. 9, when the process of S50a is completed or when a negative determination is made in S48a.

Figure 10:
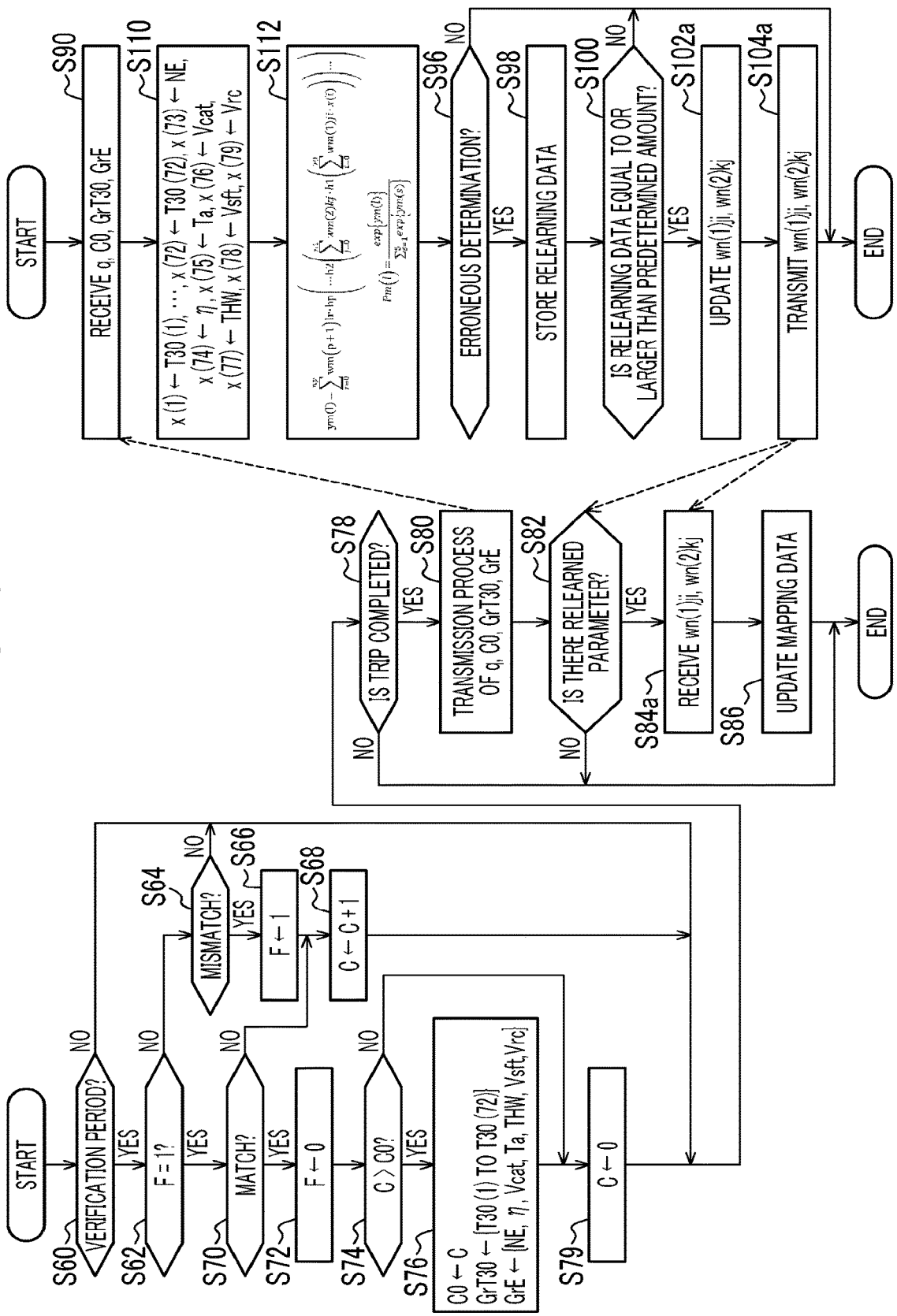
FIG. 10 is a flowchart illustrating a procedure of a process executed by the system according to the second embodiment.

FIG. 10 shows a procedure of a process related to relearning of the evaluation mapping data 76b according to the present embodiment. The process shown on the left side of FIG. 10 is realized by the CPU 72 executing the relearning subprogram 74b stored in the ROM 74 shown in FIG. 7. The process shown on the right side of FIG. 10 is realized by the CPU 102 executing the relearning main program 104a stored in the ROM 104. In FIG. 10, the same step numbers are given to the processes corresponding to the processes shown in FIG. 4 for convenience. Hereinafter, the process illustrated in FIG. 10 will be described along the time series of the relearning process.

In a series of processes shown on the right side of FIG. 10, when the process of S90 is completed, the CPU 102 puts corresponding values into the input variables x(1) to x(79) of the mapping defined by the high-specification mapping data 106b (S110). That is, assuming that "s=1 to 72", the CPU 102 puts the minute rotation time T30(s) into the input variable x(s), puts the rotation speed NE into the input variable x(73), and puts the charging efficiency η into the input variable x(74). The CPU 102 puts the outside air temperature Ta into the input variable x(75), puts the warm-up control variable Vcat into the input variable x(76), puts the coolant temperature THW into the input variable x(77), puts the shift position Vsft into the input variable x(78), and puts the engagement variable Vrc into the input variable x(79). Next, the CPU 102 puts the input variables x(1) to x(79) into the mapping defined by the high-specification mapping data 106b, and calculates the misfire variables Pm(1) to Pm(5) corresponding to the misfire variables Pn(1) to Pn(5) (S112).

In the present embodiment, the mapping defined by the high-specification mapping data 106b is formed of a neural network in which the number of intermediate layers is "p" and the activation functions h1 to hp of the intermediate layers are hyperbolic tangents. Here, assuming that m=1, 2, . . . , p, the value of each node in the m-th intermediate layer is generated by inputting the output of the linear mapping defined by the coefficient wm(m) to the activation function hm. Here, n1, n2, . . . , np are the numbers of nodes in the first, second, . . . , the p-th intermediate layers, respectively. For example, the value of each node in the first intermediate layer is generated by inputting to the activation function h1, the output obtained by inputting the input variables x(1) to x(79) into a linear mapping defined by coefficients wm(1)ji (j=0 to n1, i=0 to 79). Incidentally, wm(1)j0 or the like is a bias parameter, and the input variable x(0) is defined as "1".

The neural network includes a softmax function for receiving coefficients wm(p+1) lr (l=1 to 5, r=0 to np), and prototype variables ym(1) to ym(5) which are outputs of a linear mapping defined by the coefficients wm(p+1) lr as inputs, and outputting misfire variables Pm(1) to Pm(5).

Then, the CPU 102 determines whether or not the misfire determination based on the evaluation mapping data 76b is an erroneous determination (S96). That is, when the largest one among the misfire variables Pm(1) to Pm(5) and information "q" on the largest one among the misfire variables Pn(1) to Pn(5) received in the process of S90 do not match, the CPU 102 determines to be an erroneous determination. Specifically, for example, when the largest one among the misfire variables Pm(1) to Pm(5) is the misfire variables Pm(1) and the largest one among the misfire variables Pn(1) to Pn(5) is the misfire variables Pn(5), determination is made that an erroneous determination has been made.

When determination is made that an erroneous determination has been made (S96: YES), the CPU 102 executes the processes of S98 and S100. When an affirmative determination is made in the process of S100, the CPU 102 updates the coefficients wn(1)ji, wn(2)kj which are learned parameters of the evaluation mapping data 76b, using the relearning data 106a as training data (S102a). Then, the CPU 102 operates the communication device 107 to transmit the updated coefficients wn(1)ji, wn(2)kj to the vehicles VC1, VC2, . . . as relearned parameters (S104a). When the process of S104a is completed, or when a negative determination is made in the processes of S96 and S100, the CPU 102 temporarily ends a series of processes illustrated on the right side of FIG. 10.

On the other hand, as shown on the left side of FIG. 10, when determination is made that there is the relearned parameter (S82: YES), the CPU 102 receives coefficients wn(1)ji, wn(2)kj (S84a), and updates the evaluation mapping data 76b stored in the storage device 76 (S86).

When the process of S86 is completed, or when a negative determination is made in the processes of S78 and S82, the CPU 72 temporarily ends a series of processes illustrated on the left side of FIG. 10. As described above, in the present embodiment, when the determination result using the practical mapping data 76a and the determination result using the evaluation mapping data 76b do not match, the determination result using the evaluation mapping data 76b is verified by the determination using the high-specification mapping data 106b. Thereby, the determination result using the evaluation mapping data 76b can be verified without relying on the determination by the skilled person.

Correspondence

The correspondence between the items in the above embodiment and the items described in the section "SUMMARY" is as follows. The execution device corresponds to the CPU 72 and the ROM 74, and the storage device corresponds to the storage device 76. The first mapping data corresponds to the practical mapping data 76a. The second mapping data corresponds to the evaluation mapping data 76b. The first acquisition process corresponds to the process of S10 in FIG. 2 and the process of S40 in FIG. 8. The first calculation process corresponds to the processes of S16 and S18 in FIG. 2 and the process of S42 and S44 in FIG. 8. The second acquisition process corresponds to the process of S40 in FIG. 3 and the process of S40a in FIG. 9. The second calculation process corresponds to the processes of S42 and S44 in FIG. 3 and the process of S42a and S44a in FIG. 9. The determination process corresponds to the processes of S64 and S70. The transmission process corresponds to the process of S80. The rotation waveform variables correspond to minute rotation times T30 (1) to T30 (24). The instantaneous speed variable corresponds to the minute rotation time T30. The second interval corresponds to 30° C.A, and the first interval corresponds to 720° C.A. The instantaneous speed variables when a determination is made that there is mismatch correspond to T30 (25) to T30 (48), and the instantaneous speed variables when determination is made that there is match correspond to T30 (49) to T30 (72). This corresponds to the process of S80 being executed when an affirmative determination is made in the process of S78. The second execution device corresponds to the CPU 102 and the ROM 104. The reception process corresponds to the process of S90. The relearning data generation process corresponds to the processes of S92 to S98 in FIG. 4 and the processes of S110 and S112 in FIG. 10. The relearning process corresponds to the process of S102 in FIG. 4 and the process of S102a in FIG. 10. The display process corresponds to the process of S92. The validity determination result capturing process corresponds to the process of S94. The second storage device corresponds to the storage device 106. The third mapping data corresponds to the high-specification mapping data 106b. The third calculation process corresponds to the processes of S110 and S112.

Other Embodiments

The present embodiment can be implemented with the following modifications. The present embodiment and the following modification examples can be implemented in combination with each other within a technically consistent range.

First Mapping and First Mapping Data

In FIG. 1, data for executing the process of steps S16 and S18 is illustrated as the practical mapping data 76a, but an applicable embodiment of the present disclosure is not limited to this.

In FIG. 8, a neural network having a single intermediate layer is illustrated as the practical mapping data 76a, but an applicable embodiment of the present disclosure is not limited to this. For example, a neural network having two or more intermediate layers may be used. The activation function h1 is not limited to the hyperbolic tangent, but may be, for example, a logistic sigmoid function or ReLU. ReLU is a function that outputs the larger one of the input and "0". The number of nodes in the output layer of the neural network, that is, the dimension is not limited to "(number of cylinders)+1". For example, the number may be equal to the number of cylinders, and it may be determined that there is a misfire in a case where any of the output values exceeds a threshold. Further, for example, the number of cylinders to be subjected to misfire determination based on one output of the neural network may be one, and the number of nodes in the output layer may be one. In this case, with respect to the output layer, it is desirable that the range of possible output values is standardized by a logistic sigmoid function or the like.

Practical mapping data is not limited to data defining a neural network. For example, an identification function that outputs numerical values of different signs depending on the presence or absence of misfire in one cylinder to be subjected to misfire determination may be used. This may be configured, for example, by a support vector machine.

Second Mapping Data

The evaluation mapping data 76b as the second mapping data is not limited to data defining a neural network having one intermediate layer. For example, the second mapping data may be data defining a neural network having two or more intermediate layers. The activation function h1 is not limited to the hyperbolic tangent, but may be, for example, a logistic sigmoid function or ReLU. The number of nodes in the output layer of the neural network, that is, the dimension is not limited to "(number of cylinders)+1". For example, the number may be equal to the number of cylinders, and it may be determined that there is a misfire in a case where any of the output values exceeds a threshold. Further, for example, the number of cylinders to be subjected to misfire determination based on one output of the neural network may be one, and the number of nodes in the output layer may be one. In this case, with respect to the output layer, it is desirable that the range of possible output values is standardized by a logistic sigmoid function or the like.

The second mapping is not limited to the neural network. For example, an identification function that outputs numerical values of different signs depending on the presence or absence of misfire in one cylinder to be subjected to misfire determination may be used. This may be configured, for example, by a support vector machine.

Third Mapping and Third Mapping Data

In the above embodiment, as the third mapping data, data having a larger dimension than the input of the mapping defined by the evaluation mapping data 76b and a larger number of intermediate layers has been exemplified, but an applicable embodiment of the present disclosure is not limited to this. For example, the number of dimensions may be the same and the number of intermediate layers may be large. This can be realized, for example, by setting the number of intermediate layers to be two or more while making the input variables the same as those exemplified in S42a. Further, for example, although the number of dimensions is large, the number of intermediate layers may be the same.

In the above embodiment, the high-specification mapping data 106b is a learned model in which data transmitted from a plurality of vehicles VC1, VC2, . . . on which the internal combustion engine 10 of one specification is mounted is used as training data, but an applicable embodiment of the present disclosure is not limited to this. For example, data transmitted from vehicles equipped with various internal combustion engines having different numbers of cylinders, displacements, or the like may be used as training data. However, in this case, it is desirable that the specification information such as the number of cylinders and the displacement is an input variable of the mapping defined by the high-specification mapping data 106b. The input variables of the mapping defined by the high-specification mapping data 106b are not limited to these, and may include, for example, variables that are not used by a skilled person in making a determination. It is not essential to use a result of determination by the skilled person for at least a part of the teacher data when learning the high-specification mapping data 106b.

Instantaneous Speed Variable

The instantaneous speed variable is not limited to the minute rotation time, which is the time for rotation at the second interval. For example, a value obtained by dividing the second interval by the minute rotation time may be used.

Second Interval

The second interval defining the instantaneous speed variable to be input to the mapping is not limited to 30° C.A. For example, the angular interval may be smaller than 30° C.A, such as 10° C.A. However, the angular interval is not limited to 30° CA or less, but may be 45° C.A or the like.

Rotation Waveform Variables as Input to Mapping

In the above embodiment, the minute rotation time T30 at each of a plurality of divided intervals of the rotation angular interval of 720° C.A, which is one combustion cycle, is input to the mapping, but an applicable embodiment of the present disclosure is not limited to this. For example, 0 to 20, 40 to 60, 80 to 100, 120 to 140, 160 to 180, . . . , or 700 to 720 out of 0 to 720° C.A may be used as a second interval, and the time for the rotation may be used as an input to mapping.

The rotation waveform variable as an input to the mapping is not limited to the time-series data of the instantaneous speed variable. For example, a difference between a pair of instantaneous speed variables separated by the appearance interval of the compression top dead center may be used.

Transmission Process

In the above embodiment, the time-series data of the minute rotation time T30 for three combustion cycles is transmitted, but an applicable embodiment of the present disclosure is not limited to this. For example, time-series data for two combustion cycles of the minute rotation times T30(25) to T30(48) when the determination result using the practical mapping data 76a and the determination result using the evaluation mapping data 76b do not match and the minute rotation times T30(49) to T30(72) at the time of transition from the state where a determination is made that there is mismatch to the state where a determination is made that there is match may be used.

In the above embodiment, the minute rotation times T30(49) to T30(72) at the time of transition from the state where a determination is made that there is mismatch to the state where a determination is made that there is match are transmitted, in addition to the minute rotation times T30(25) to T30(48) when the determination result using the practical mapping data 76a and the determination result using the evaluation mapping data 76b do not match, an applicable embodiment of the present disclosure is not limited to this. For example, the time-series data of the minute rotation time T30 in the state where a determination is made that there is match and the time-series data of the minute rotation time T30 at the time of transition from the state where a determination is made that there is match to the state where a determination is made that there is mismatch may be transmitted.

The time-series data of the minute rotation time T30 at the time of transition to the state where a determination is made that there is match is not limited to the time-series data of one combustion cycle. For example, as described in the section "Second Mapping Data", when the output value by one input is the output of solely the value of the misfire variable of one cylinder, and the input data itself is time-series data of the minute rotation time T30 in a period shorter than one combustion cycle, the time-series data may be time-series data of the amount corresponding to the period. However, it is not essential that the time-series data of the minute rotation time T30 in the state where a determination is made that there is mismatch and the time-series data of the minute rotation time T30 at the time of transition to the state where a determination is made that there is match are the time-series data of the minute rotation time T30 in the section having the same length.

In the above embodiment, the time-series data of the minute rotation time T30 for three combustion cycles corresponding to the case where the number of times of consecutive determination that there is mismatch is maximum once per trip is transmitted, but an applicable embodiment of the present disclosure is not limited to this. For example, time-series data of all of the minute rotation times T30 during the period when a determination is made that there are consecutive mismatch, and time-series data for one combustion cycle of the minute rotation time T30 at a time of transition from the state where a determination is made that there is mismatch to the state where a determination is made that there is match may be transmitted.

Relearned Parameters

In FIGS. 4 and 10, the relearned parameters, which are updated parameters, are transmitted to each of the vehicles VC1, VC2, . . . via the network 110, but an applicable embodiment of the present disclosure is not limited to this. For example, the relearned parameters may be transmitted to the store of the vehicle, and the data in the storage device 76 may be updated when each of the vehicles VC1, VC2, . . . are entered the store. Even in such a case, it is possible to further evaluate and update the reliability of the evaluation mapping data 76b updated by the relearned parameters.

However, it is not essential to provide the vehicle that has provided the data used for the relearning with the relearned parameters. The evaluation mapping data 76b may be updated using the relearned parameters, and the updated evaluation mapping data 76b may simply be mounted on a newly developed vehicle. In such a case, it is desirable that the difference between the displacement of the internal combustion engine mounted on the newly developed vehicle and the displacement of the internal combustion engine mounted on the vehicle to which the data for relearning is transmitted is equal to or less than a predetermined amount. As in the above embodiment, when the evaluation mapping data is for outputting the misfire variable according to the probability of the occurrence of misfire in each cylinder, it is desirable that the number of cylinders of the internal combustion engine mounted in newly developed vehicles is the same as the number of cylinders of the internal combustion engine mounted on the vehicle that has sent data for relearning.

In the processes of FIGS. 4 and 10, after the evaluation mapping data 76b is updated using the relearned parameters, the practical mapping data 76a may be overwritten.

Display Apparatus

In the above embodiment, the display apparatus 112 is disposed in the data analysis center 100. However, an applicable embodiment of the present disclosure is not limited to this, and the display apparatus 112 may be disposed in a site different from the site where the storage device 106 or the like is disposed.

Relearning Data Generation Process

In FIG. 4, the input data used for calculating the misfire variables P(j) and Pn(j) calculated using the evaluation mapping data 76b and the related data are displayed on the display apparatus 112, thereby a skilled person evaluates whether or not this is an erroneous determination, but an applicable embodiment of the present disclosure is not limited to this. For example, the evaluation may be performed automatically using the high-specification mapping data 106b. When evaluating the misfire variables P(j) and Pn(j) calculated using the evaluation mapping data 76b, it is not essential to perform evaluation in consideration of data other than the input data used for calculating the misfire variables P(j) and Pn(j).

In FIG. 10, it is automatically evaluated whether or not an erroneous determination is made, using the high-specification mapping data 106b based on the input data used for calculating the misfire variable Pn(j) calculated using the evaluation mapping data 76b and related data, but an applicable embodiment of the present disclosure is not limited to this, for example, a skilled person may perform evaluation.

In the process of FIG. 4, for convenience of description, the process of S92 is executed each time determination is made that there is mismatch between the evaluation result using the evaluation mapping data 76b and the evaluation result using the practical mapping data 76a, but an applicable embodiment of the present disclosure is not limited to this. For example, the process of S92 may be executed when a predetermined amount of data determined to be mismatched is accumulated. For example, the mismatched data may be accumulated each time, and the process of S92 may be executed in response to a request from a skilled person.

In the above embodiment, the validity of the determination result of the mapping defined by the evaluation mapping data 76b is determined by using a subject having higher accuracy than the mapping defined by the evaluation mapping data 76b and the practical mapping data 76a, an applicable embodiment of the present disclosure is not limited to this. For example, the validity of the determination result of the mapping defined by the evaluation mapping data 76b may be determined by a majority decision between the determination result defined by the evaluation mapping data 76b and the determination result by two or more other mappings. For example, one of the determination results by the two or more other mappings may be determined by a skilled person instead of the determination result based on the mapping.

Coping Process

In the above embodiment, the process of operating the warning light 90 mounted on the vehicle has been exemplified as the notification process, but an applicable embodiment of the present disclosure is not limited to this. For example, a process of operating the communication device 77 to display information indicating that an abnormality has occurred on the user's portable terminal may be employed.

The coping process is not limited to the notification process. For example, it may be a process of operating an operation unit for controlling the combustion of the air-fuel mixture in the combustion chamber 18 of the internal combustion engine 10 in accordance with information indicating that misfire has occurred.

Misfire Detection System

In the above embodiment, the misfire detection system is configured by the control device 70 and the data analysis center 100, but an applicable embodiment of the present disclosure is not limited to this. For example, the misfire detection system may be configured with a portable terminal, in addition to the control device 70 and the data analysis center 100. This can be realized, for example, by the portable terminal executing the processing in FIG. 3 and transmitting the result to the control device 70, in the first embodiment.

Data Analysis Apparatus

A data analysis apparatus may be configured using a portable terminal instead of the data analysis center 100. This can be realized, for example, by storing the high-specification mapping data 106b or the like in the storage device of the portable terminal and executing the process on the right side of FIG. 10 by the portable terminal. In this case, solely data on the vehicle VC1 may be transmitted to the portable terminal of the user of the vehicle VC1.

Execution Device

The execution device is not limited to a device that includes the CPU 72 (102) and the ROM 74 (104) and executes software process. For example, a dedicated hardware circuit (for example, an ASIC) that performs hardware processing on at least a part of the software processing in the above embodiment may be provided. That is, the execution device may have any one of the following configurations (a) to (c). (a) A processing device that executes all of the above processes in accordance with a program, and a program storage device such as a ROM that stores the program are provided. (b) A processing device that executes some of the above processes in accordance with a program, a program storage device, and a dedicated hardware circuit that executes the remaining processes are provided. (c) A dedicated hardware circuit that executes all of the above processes is provided. Here, there may be a plurality of software execution devices including the processing device and the program storage device, and a plurality of dedicated hardware circuits.

Storage Device

In the above embodiment, the storage device 76 in which the evaluation mapping data 76b and the practical mapping data 76a are stored and the ROM 74 as the storage device in which the relearning subprogram 74b is stored are separate storage devices, but an applicable embodiment of the present disclosure is not limited to this. For example, the storage device 106 in which the high-specification mapping data 106b is stored and the ROM 104 as a storage device in which the relearning main program 104a is stored are separate storage devices, but an applicable embodiment of the present disclosure is not limited to this.

Internal Combustion Engine

In the above embodiment, the in-cylinder injection valve that injects fuel into the combustion chamber 18 is exemplified as the fuel injection valve, but an applicable embodiment of the present disclosure is not limited to this. For example, a port injection valve that injects fuel into the intake passage 12 may be used. For example, both a port injection valve and an in-cylinder injection valve may be provided.

The internal combustion engine is not limited to a spark ignition type internal combustion engine, but may be a compression ignition type internal combustion engine using light oil or the like as fuel. It is not essential that the internal combustion engine constitutes the drive system. For example, it may be mounted on a so-called series hybrid vehicle in which the crankshaft is mechanically connected to the on-vehicle generator and the power transmission from the drive wheel 60 is cut off.

Vehicle

The vehicle is not limited to a vehicle in which the device that generates the propulsion force of the vehicle is solely an internal combustion engine. For example, in addition to the series hybrid vehicle described in the section "About internal combustion engine", a parallel hybrid vehicle or a series-parallel hybrid vehicle may be used.

Others

The drive system device interposed between the crankshaft and the drive wheels is not limited to a stepped transmission, and may be, for example, a continuously variable transmission.

What is claimed is:

1. A misfire detection apparatus comprising:
   a storage device configured to store first mapping data defining a first mapping for receiving first input data based on a detection value of a crank angle sensor of an internal combustion engine mounted on a vehicle as an input and outputting a value of a first misfire variable that is a variable related to the presence or absence of misfire of the internal combustion engine, and second mapping data defining a second mapping for receiving second input data based on the detection value of the crank angle sensor as an input and outputting a value of a second misfire variable that is a variable related to the presence or absence of misfire of the internal combustion engine, the second mapping data including data learned by machine learning; and
   an execution device configured to execute a first acquisition process of acquiring the first input data, a first calculation process of calculating a value of the first misfire variable by using the first input data acquired in the first acquisition process as an input of the first mapping, a second acquisition process of acquiring the second input data, a second calculation process of calculating a value of the second misfire variable by using the second input data acquired in the second acquisition process as an input of the second mapping, a determination process of determining whether or not a calculation result of the second calculation process and a calculation result of the first calculation process match, a count process of counting the number of consecutive times when a determination is made in the determination process that there is mismatch, and a transmission process of transmitting, to an outside of the vehicle, data on the value of the second misfire variable corresponding to the maximum number of times among the numbers of consecutive times counted in the count process during a predetermined period and data on the second input data used for calculating the value of the second misfire variable.

2. The misfire detection apparatus according to claim 1, wherein the transmission process includes a process of transmitting data on the maximum number of times, in addition to data on a predetermined number of value among values of the second misfire variable corresponding to the maximum number of times and data on the second input data used for calculating each of the values.

3. The misfire detection apparatus according to claim 2, wherein:
   the second input data is a rotation waveform variable that is a variable including information about a difference between values of instantaneous speeds at different angular intervals, the instantaneous speeds being rotation speeds of the crankshaft of the internal combustion engine at the angular intervals smaller than an appearance interval of a compression top dead center of the internal combustion engine;
   the data on the second input data used for calculating the value of the second misfire variable is an instantaneous speed variable which is a variable indicating the instantaneous speed at each of the angular intervals including information about a difference between the instantaneous speeds indicated by the rotation waveform variable used for calculating the value of the second misfire variable when a determination is made in the determination process that there is mismatch; and
   the data to be transmitted in the transmission process includes the instantaneous speed variable in each of the angular intervals generated before and after the angular interval in time series, including information on the difference between the instantaneous speeds indicated by the rotation waveform variable used for the calculation.

4. The misfire detection apparatus according to claim 3, wherein:
   the angular interval is a second interval, the rotation waveform variable is time-series data configured with a variable that indicates a difference between the instantaneous speed variables by the instantaneous speed variable at each of the consecutive second intervals included in the first interval larger than the second interval; and
   the data to be transmitted in the transmission process includes the instantaneous speed variable in each of the consecutive second intervals adjacent to the first interval, in addition to the instantaneous speed variable at each of the second intervals included in the first interval when a determination is made in the determination process that there is mismatch.

5. The misfire detection apparatus according to claim 3, wherein the data to be transmitted in the transmission process includes the instantaneous speed variable when a determination is made in the determination process that there is match, in addition to the instantaneous speed variable relating to the rotation waveform variable used for calculating the value of the second misfire variable when a determination is made in the determination process that there is mismatch.

6. The misfire detection apparatus according to claim 4, wherein the data to be transmitted in the transmission process includes the instantaneous speed variable when a determination is made in the determination process that there is match, in addition to the instantaneous speed variable relating to the rotation waveform variable used for calculating the value of the second misfire variable when a determination is made in the determination process that there is mismatch.

7. The misfire detection apparatus according to claim 5, wherein the data to be transmitted in the transmission process includes the instantaneous speed variable when a determination is made in the determination process that there is mismatch, and the instantaneous speed variable in a state where a determination is made that there is match at a time of transition from a state where a determination is made that there is mismatch to the state where a determination is made in the determination process that there is match.

8. The misfire detection apparatus according to claim 6, wherein the data to be transmitted in the transmission process includes the instantaneous speed variable when a determination is made in the determination process that there is mismatch, and the instantaneous speed variable in a state where a determination is made that there is match at a time of transition from a state where a determination is made that there is mismatch to the state where a determination is made in the determination process that there is match.

9. The misfire detection apparatus according to claim 1, wherein the execution device sets a time interval between a pair of end times adjacent to each other in time series among end times of travel of the vehicle to the predetermined period, and executes the transmission process at the end time of the travel of the vehicle.

10. The misfire detection apparatus according to claim 2, wherein the execution device sets a time interval between a pair of end times adjacent to each other in time series among end times of travel of the vehicle to the predetermined period, and executes the transmission process at the end time of the travel of the vehicle.

11. The misfire detection apparatus according to claim 3, wherein the execution device sets a time interval between a pair of end times adjacent to each other in time series among end times of travel of the vehicle to the predetermined period, and executes the transmission process at the end time of the travel of the vehicle.

12. The misfire detection apparatus according to claim 4, wherein the execution device sets a time interval between a pair of end times adjacent to each other in time series among end times of travel of the vehicle to the predetermined period, and executes the transmission process at the end time of the travel of the vehicle.

13. The misfire detection apparatus according to claim 5, wherein the execution device sets a time interval between a pair of end times adjacent to each other in time series among end times of travel of the vehicle to the predetermined period, and executes the transmission process at the end time of the travel of the vehicle.

14. The misfire detection apparatus according to claim 6, wherein the execution device sets a time interval between a pair of end times adjacent to each other in time series among end times of travel of the vehicle to the predetermined period, and executes the transmission process at the end time of the travel of the vehicle.

15. The misfire detection apparatus according to claim 7, wherein the execution device sets a time interval between a pair of end times adjacent to each other in time series among end times of travel of the vehicle to the predetermined period, and executes the transmission process at the end time of the travel of the vehicle.

16. The misfire detection apparatus according to claim 8, wherein the execution device sets a time interval between a pair of end times adjacent to each other in time series among end times of travel of the vehicle to the predetermined period, and executes the transmission process at the end time of the travel of the vehicle.

17. A misfire detection system comprising:
a storage device configured to store first mapping data defining a first mapping for receiving first input data based on a detection value of a crank angle sensor of an internal combustion engine mounted on a vehicle as an input and outputting a value of a first misfire variable that is a variable related to the presence or absence of misfire of the internal combustion engine, and second mapping data defining a second mapping for receiving second input data based on the detection value of the crank angle sensor as an input and outputting a value of a second misfire variable that is a variable related to the presence or absence of misfire of the internal combustion engine, and the second mapping data including data learned by machine learning;
a first execution device mounted on the vehicle, the first execution device being configured to execute a first acquisition process of acquiring the first input data, a first calculation process of calculating a value of the first misfire variable by using the first input data acquired in the first acquisition process as an input of the first mapping, a second acquisition process of acquiring the second input data, a second calculation process of calculating a value of the second misfire variable by using the second input data acquired in the second acquisition process as an input of the second mapping, a determination process of determining whether or not a calculation result of the second calculation process and a calculation result of the first calculation process match, a count process of counting the number of consecutive times when a determination is made in the determination process that there is mismatch, and a transmission process of transmitting, to an outside of the vehicle, data on the value of the second misfire variable corresponding to the maximum number of times among the numbers of consecutive times counted in the count process during a predetermined period and data on the second input data used for calculating the value of the second misfire variable; and
a second execution device outside the vehicle, the second execution device being configured to execute a reception process of receiving the data transmitted in the transmission process, a relearning data generation process of generating relearning data that is data for relearning the second mapping, based on the data received in the reception process, and a relearning process of relearning the second mapping data, based on the relearning data generated in the relearning data generation process.

18. The misfire detection system according to claim 17, wherein the relearning data generation process includes a display process of displaying the data received in the reception process on a display apparatus, a validity determination result capturing process of capturing information on whether or not there is an error in the output value of the second mapping, and a process of generating data for updating the second mapping data, based on the information captured in the validity determination result capturing process.

19. The misfire detection system according to claim 17, wherein:

the storage device includes a first storage device mounted on the vehicle and a second storage device outside the vehicle;

the second storage device is configured to store third mapping data defining third mapping which receives third input data based on the detection value of the crank angle sensor as an input and outputs a value of a third misfire variable, which is a variable related to the presence or absence of misfire in the internal combustion engine; and the relearning data generation process includes a third calculation process of inputting the data received in the reception process into the third mapping and calculates the value of the third misfire variable, and a process of generating data for updating the second mapping data, based on whether or not the calculation result of the third calculation process and the calculation result of the second calculation process match.

20. A data analysis apparatus comprising an execution device outside a vehicle, the execution device being configured to execute a reception process of receiving data on a value of a misfire variable in an internal combustion engine corresponding to the maximum number of times among the numbers of consecutive times counted in a predetermined period, transmitted from the vehicle, and data on input data based on a detection value of a crank angle sensor used to calculate the value of the misfire variable, a relearning data generation process of generating relearning data that is data for relearning a mapping, based on the data received by the reception process, and a relearning process of relearning the mapping data, based on the relearning data generated in the relearning data generation process, wherein:

the mapping is a mapping defined so as to receive input data based on the detection value of the crank angle sensor as an input and to output a value of the misfire variable that is a variable relating to the presence or absence of misfire in the internal combustion engine.

* * * * *